United States Patent
Zhang et al.

(10) Patent No.: US 12,261,800 B2
(45) Date of Patent: Mar. 25, 2025

(54) NON-OVERLAPPED CROSS-LINK INTERFERENCE REFERENCE SIGNAL TRANSMISSION AND RECEPTION WINDOWS

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 17/657,881

(22) Filed: Apr. 4, 2022

(65) Prior Publication Data

US 2023/0318785 A1 Oct. 5, 2023

(51) Int. Cl.
*H04L 5/00* (2006.01)
*H04B 17/345* (2015.01)

(52) U.S. Cl.
CPC ......... *H04L 5/0053* (2013.01); *H04B 17/345* (2015.01)

(58) Field of Classification Search
CPC ..... H04L 5/0073; H04L 5/001; H04L 5/0053; H04L 5/0023; H04L 5/0048; H04L 5/16;
(Continued)

(56) References Cited

U.S. PATENT DOCUMENTS

2018/0014333 A1* 1/2018 Moon .................... H04L 5/0051
2020/0358579 A1* 11/2020 Liu ....................... H04B 7/0617

FOREIGN PATENT DOCUMENTS

WO 2022061343 A2 3/2022
WO 2022067322 A1 3/2022

OTHER PUBLICATIONS

Cewit., et al., "Discussion on Simultaneous Operation of IAB-node's Child and Parent Links", 3GPP TSG RAN WG1 Meeting #104-e, R1-2100955, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021, 9 Pages, XP051971294, 2. Enhancements in Handling Interference, a. Inter-IAB Node Interference, 5. Conclusion.
(Continued)

*Primary Examiner* — Quoc Thai N Vu
(74) *Attorney, Agent, or Firm* — Guang Y. Zhang; Harrity & Harrity, LLP

(57) ABSTRACT

Various aspects of the present disclosure generally relate to wireless communication. In some aspects, a central network entity may configure, for a network node, a first configuration indicating one or more transmission windows for inter-network node cross-link interference (CLI) measurement reference signaling. The central network entity may configure, for the network node, a second configuration indicating a plurality of reception windows for inter-network node CLI measurement reference signaling, wherein the one or more transmission windows are configured to be non-overlapped with each reception window of the plurality of reception windows. Numerous other aspects are described.

30 Claims, 13 Drawing Sheets

(58) Field of Classification Search
CPC .......... H04L 27/26025; H04L 27/2613; H04L 5/0082; H04L 5/0091; H04L 5/14; H04L 5/1461; H04W 72/541; H04W 24/08; H04W 24/10; H04W 72/0446; H04W 72/542; H04B 17/345; H04B 7/06952
See application file for complete search history.

(56) References Cited

OTHER PUBLICATIONS

International Search Report and Written Opinion—PCT/US2023/016732—ISA/EPO—Jul. 7, 2023.

* cited by examiner

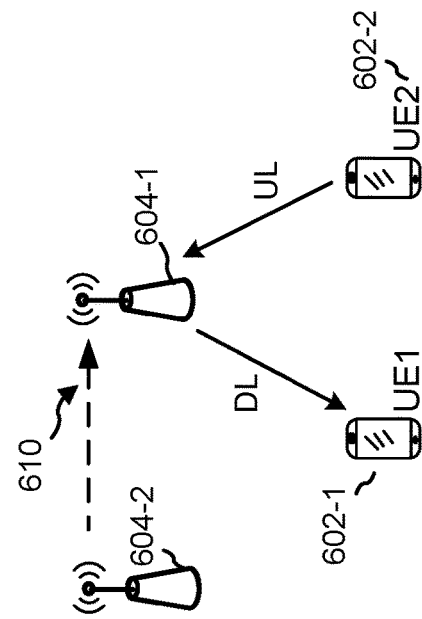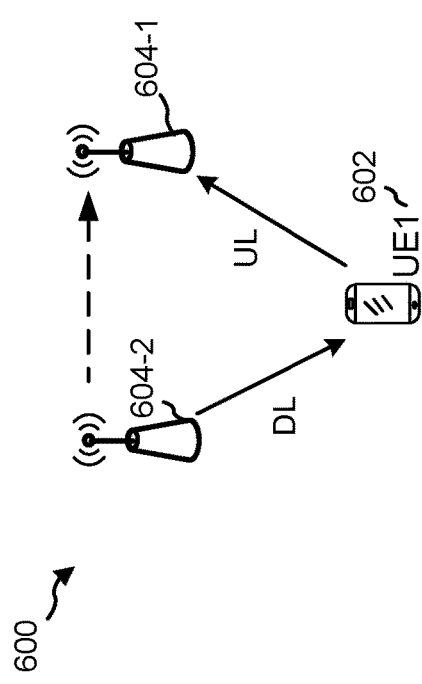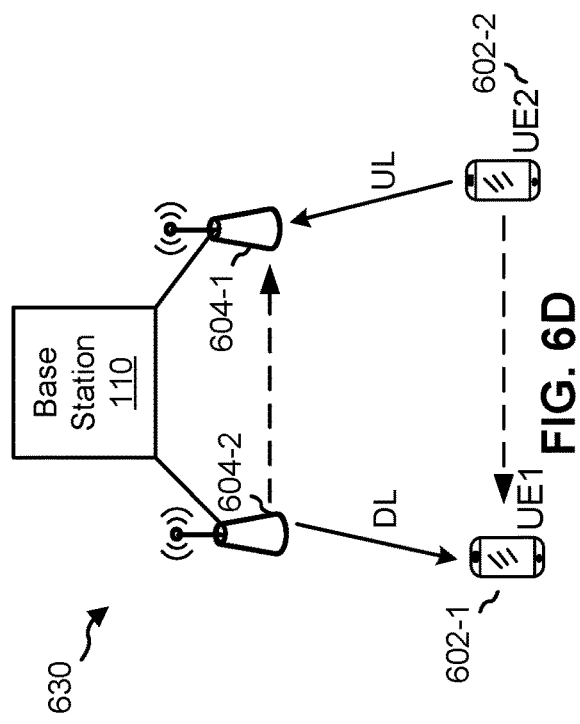

NON-OVERLAPPED CROSS-LINK INTERFERENCE REFERENCE SIGNAL TRANSMISSION AND RECEPTION WINDOWS

FIELD OF THE DISCLOSURE

Aspects of the present disclosure generally relate to wireless communication and to techniques and apparatuses for non-overlapped cross-link interference reference signal transmission and reception windows.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a central network entity. The method may include configuring, for a network node, a first configuration indicating one or more transmission windows for inter-network node cross-link interference (CLI) measurement reference signaling. The method may include configuring, for the network node, a second configuration indicating a plurality of reception windows for inter-network node CLI measurement reference signaling, wherein the one or more transmission windows are configured to be non-overlapped with each reception window of the plurality of reception windows.

Some aspects described herein relate to a method of wireless communication performed by a network node. The method may include receiving a first configuration indicating one or more transmission windows for inter-network node CLI measurement reference signaling. The method may include receiving a second configuration indicating one or more reception windows for inter-network node CLI measurement reference signaling, wherein the one or more transmission windows are configured to be non-overlapped with each reception window of the one or more reception windows.

Some aspects described herein relate to an apparatus of a central network entity for wireless communication. The apparatus may include a memory and one or more processors coupled to the memory. The one or more processors may be configured to cause the central network entity to configure, for a network node, a first configuration indicating one or more transmission windows for inter-network node CLI measurement reference signaling. The one or more processors may be configured to cause the central network entity to configure, for the network node, a second configuration indicating a plurality of reception windows for inter-network node CLI measurement reference signaling, wherein the one or more transmission windows are configured to be non-overlapped with each reception window of the plurality of reception windows.

Some aspects described herein relate to an apparatus of a network node for wireless communication. The apparatus may include a memory and one or more processors coupled to the memory. The one or more processors may be configured to cause the network node to receive a first configuration indicating one or more transmission windows for inter-network node CLI measurement reference signaling. The one or more processors may be configured to cause the network node to receive a second configuration indicating one or more reception windows for inter-network node CLI measurement reference signaling, wherein the one or more transmission windows are configured to be non-overlapped with each reception window of the one or more reception windows.

Some aspects described herein relate to a non-transitory computer-readable medium that stores a set of instructions for wireless communication by a central network entity. The set of instructions, when executed by one or more processors of the central network entity, may cause the central network entity to configure, for a network node, a first configuration indicating one or more transmission windows for inter-network node CLI measurement reference signaling. The set of instructions, when executed by one or more processors of the central network entity, may cause the central network entity to configure, for the network node, a second configuration indicating a plurality of reception windows for inter-network node CLI measurement reference signaling, wherein the one or more transmission windows are configured to be non-overlapped with each reception window of the plurality of reception windows.

Some aspects described herein relate to a non-transitory computer-readable medium that stores a set of instructions for wireless communication by a network node. The set of instructions, when executed by one or more processors of the network node, may cause the network node to receive a first configuration indicating one or more transmission windows for inter-network node CLI measurement reference signaling. The set of instructions, when executed by one or more processors of the network node, may cause the network node to receive a second configuration indicating one or more reception windows for inter-network node CLI measurement reference signaling, wherein the one or more transmission windows are configured to be non-overlapped with each reception window of the one or more reception windows.

Some aspects described herein relate to an apparatus for wireless communication. The apparatus may include means for configuring, for a network node, a first configuration indicating one or more transmission windows for inter-network node CLI measurement reference signaling. The apparatus may include means for configuring, for the network node, a second configuration indicating a plurality of reception windows for inter-network node CLI measurement reference signaling, wherein the one or more transmission windows are configured to be non-overlapped with each reception window of the plurality of reception windows.

Some aspects described herein relate to an apparatus for wireless communication. The apparatus may include means for receiving a first configuration indicating one or more transmission windows for inter-network node CLI measurement reference signaling. The apparatus may include means for receiving a second configuration indicating one or more reception windows for inter-network node CLI measurement reference signaling, wherein the one or more transmission windows are configured to be non-overlapped with each reception window of the one or more reception windows.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A-6D are diagrams illustrating examples of full duplex (FD) communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
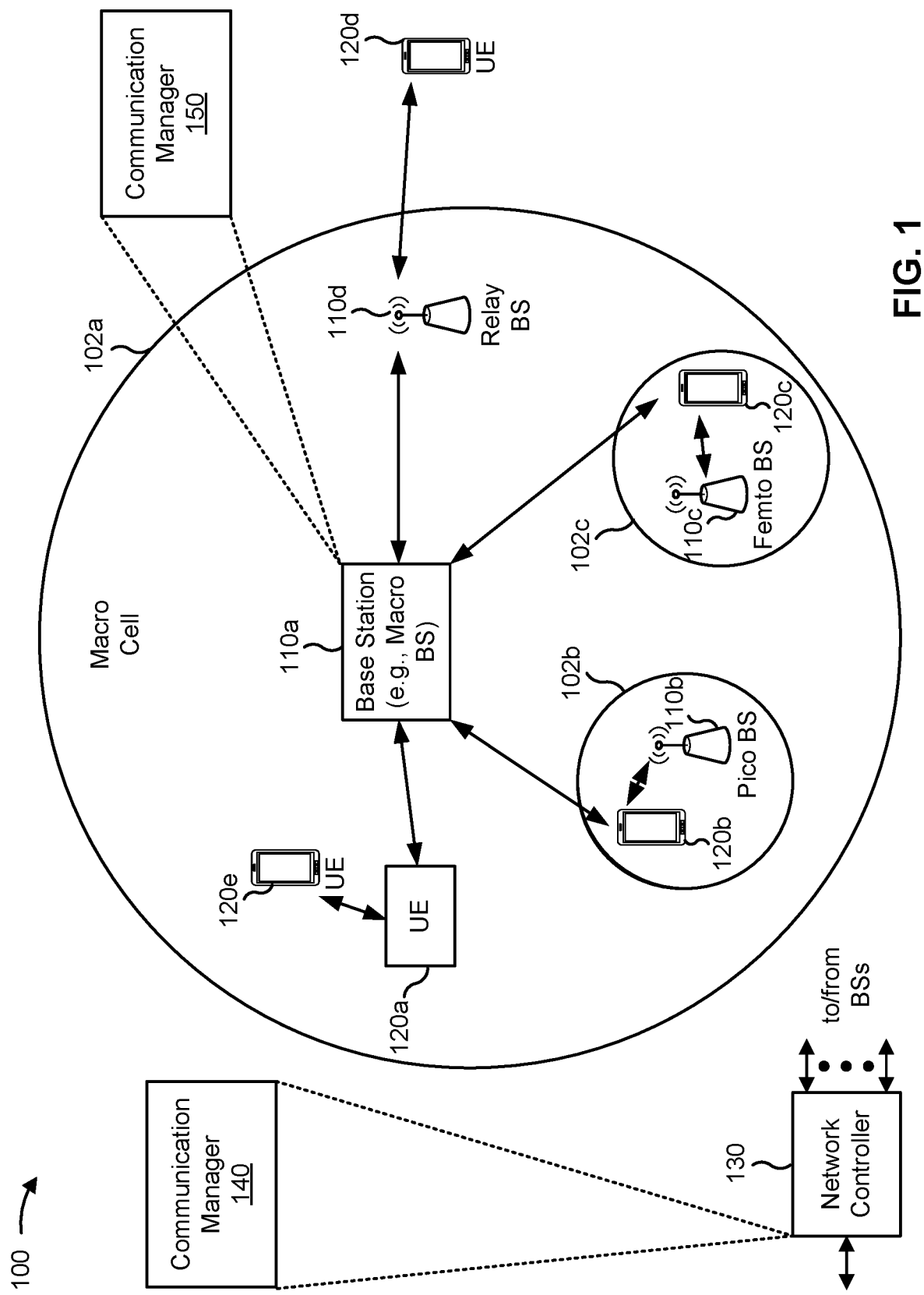
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul, midhaul, or fronthaul communication link. In some aspects, the network controller 130 may include a central network entity, such as a central unit (CU) or an operations, administration, and maintenance (OAM) function. The network controller 130 may be implemented using hardware, software, or a combination of hardware and software. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a central network entity, such as network controller 130 or base station 110 may include a communication manager 140. As described in more detail elsewhere herein, the communication manager 140 may configure, for a network node, a first configuration indicating one or more transmission windows for inter-network node, CLI measurement reference signaling; and configure, for the network node, a second configuration indicating a plurality of reception windows for inter-network node CLI measurement reference signaling, wherein the one or more transmission windows are configured to be non-overlapped with each reception window of the plurality of reception windows. Additionally, or alternatively, the communication manager 140 may perform one or more other operations described herein.

In some aspects, a network node, such as the base station 110, may include a communication manager 150. As described in more detail elsewhere herein, the communication manager 150 may receive a first configuration indicating one or more transmission windows for inter-network node CLI measurement reference signaling; and receive a second configuration indicating one or more reception windows for inter-network node CLI measurement reference signaling, wherein the one or more transmission windows are configured to be non-overlapped with each reception window of the one or more reception windows. Additionally, or alternatively, the communication manager 150 may perform one or more other operations described herein.

As indicated above, FIG. 1 is provided as an example. Other examples may differ from what is described with regard to FIG. 1.

Figure 2:
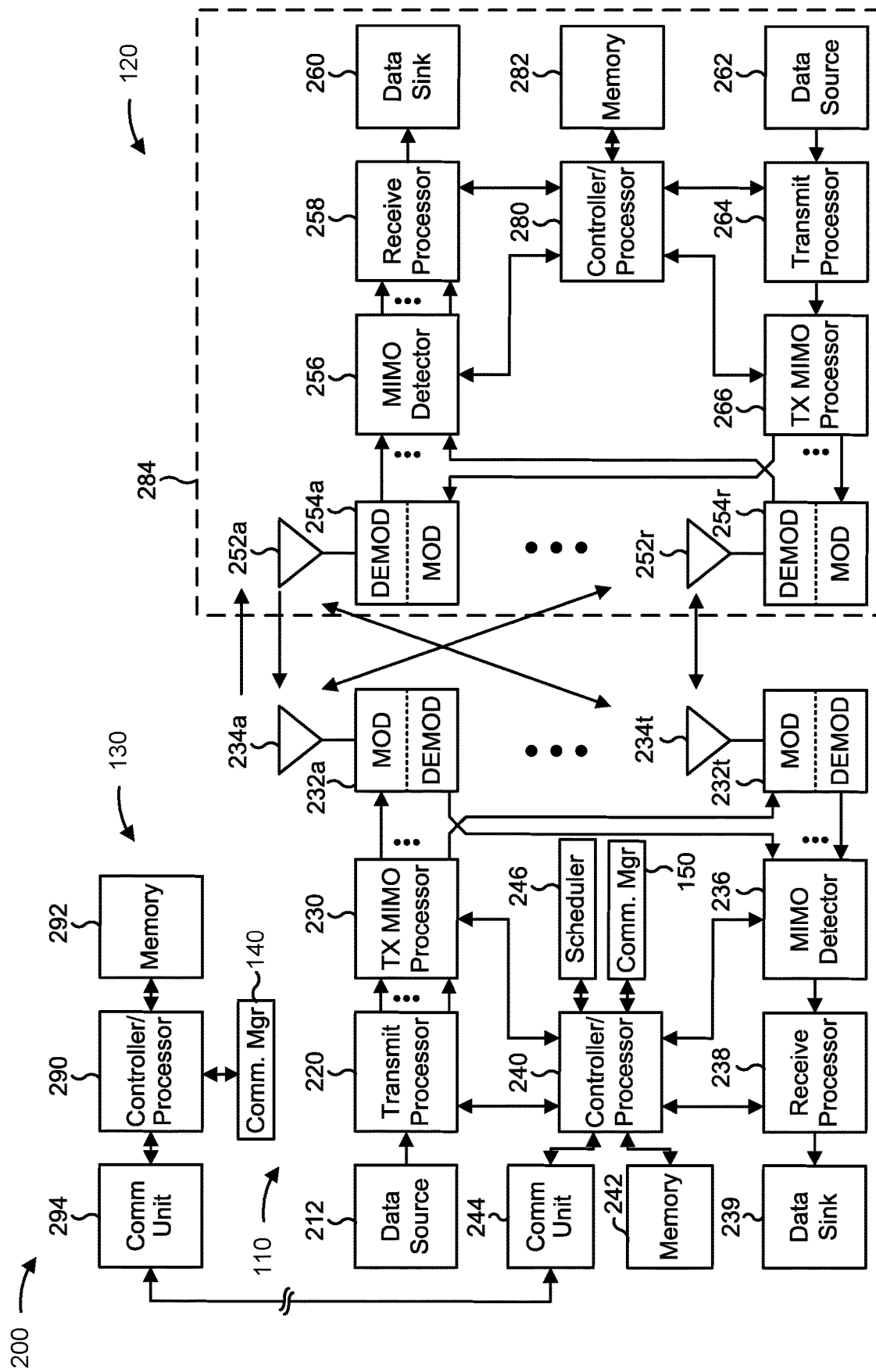
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-13).

The controller/processor 240 of the base station 110, the controller/processor 280 of the UE 120, and/or any other component(s) of FIG. 2 may perform one or more techniques associated with configuring transmission and reception windows for inter-network node CLI measurement reference signaling, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a central network entity includes means for configuring, for a network node, a first configuration indicating one or more transmission windows for inter-network node cross-link interference (CLI) measurement reference signaling; and/or means for configuring, for the network node, a second configuration indicating a plurality of reception windows for inter-network node CLI measurement reference signaling, wherein the one or more transmission windows are configured to be non-overlapped with each reception window of the plurality of reception windows. In some aspects, the means for the central network entity to perform operations described herein may include, for example, one or more of communication manager 140, controller/processor 290, or memory 292. In some aspects, such means may include one or more components or functions described with regard to FIGS. 3-6.

In some aspects, a network node includes means for receiving a first configuration indicating one or more transmission windows for inter-network node CLI measurement reference signaling; and/or means for receiving a second configuration indicating one or more reception windows for inter-network node CLI measurement reference signaling, wherein the one or more transmission windows are configured to be non-overlapped with each reception window of the one or more reception windows. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as a CU, one or more distributed units (DUs), or one or more radio units (RUs)). In some examples, a CU may be implemented within a radio access network (RAN) node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
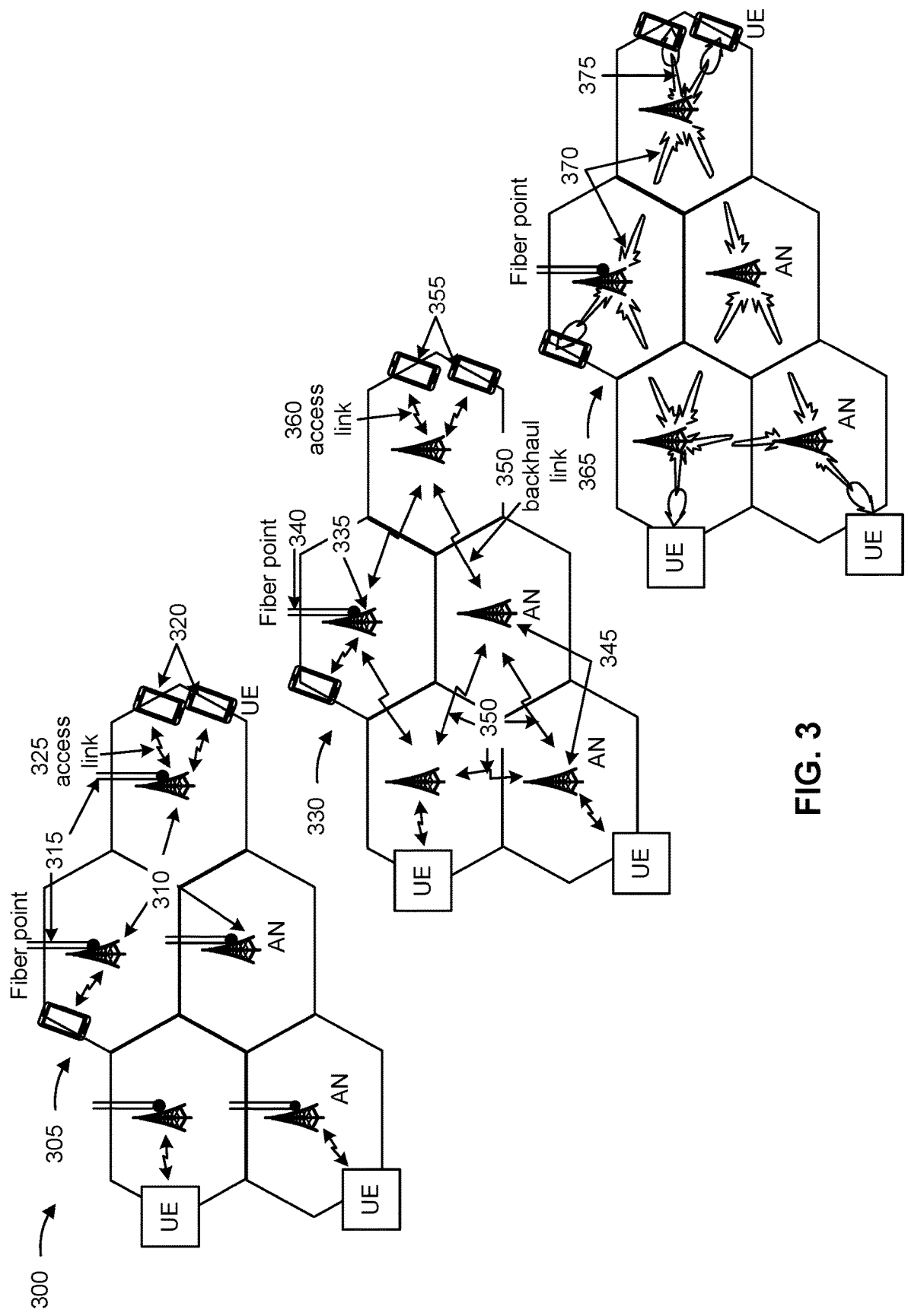
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
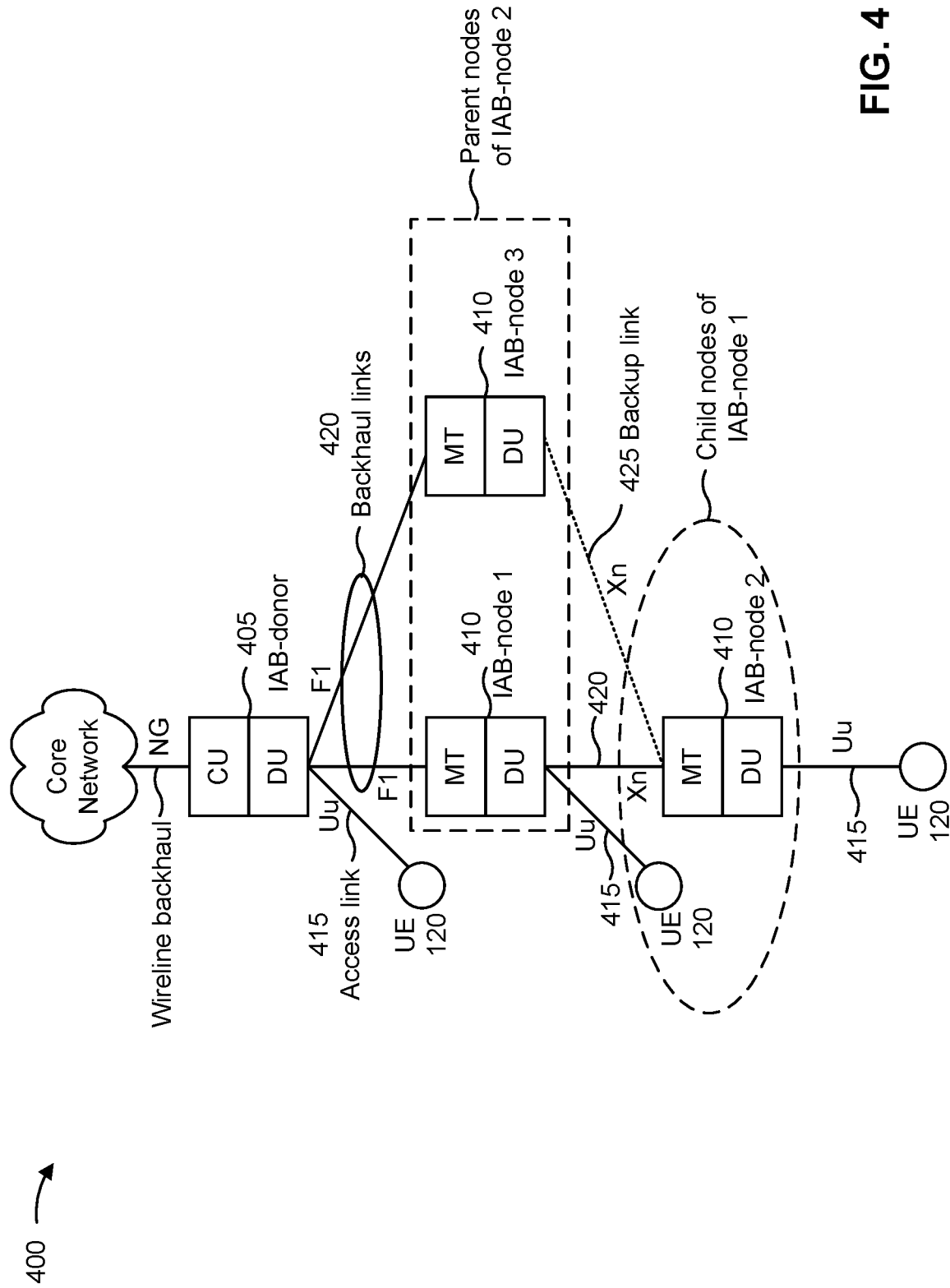
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an NG interface of an IAB donor 405 may terminate at a core network. Additionally, or alternatively, an IAB donor 405 may connect to one or more devices of the core network that provide a core access and mobility management function (AMF) and/or to one or more devices that provide an OAM function. In some aspects, an IAB donor 405 may include a base station 110, such as an anchor base station, as described above in connection with FIG. 3. As shown, an IAB donor 405 may include a CU, which may perform access node controller (ANC) functions and/or AMF functions. In some aspects, the CU, the IAB donor 405, or the OAM function may be referred to herein as a central network entity. The CU may configure a DU of the IAB donor 405 and/or may configure one or more IAB nodes 410 (e.g., a mobile termination (MT) and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message). In some aspects, a link between a CU and a DU may be referred to as an F1 interface.

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. The access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network. In some aspects, the access link 415 between a UE 120 and an IAB donor 405, or between a UE 120 and an IAB node 410, may be referred to as the Uu interface.

As further shown in FIG. 4, a link between an IAB donor 405 and an IAB node 410 or between two IAB nodes 410 may be referred to as a backhaul link 420, and is sometimes referred to as an Xn interface. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410. In some aspects, one or more of the network nodes described in connection with FIG. 4 (e.g., one or more of the CU nodes (e.g., the IAB donor 405 or a similar node), DU nodes (e.g., the IAB donor 405, the IAB nodes 410, or similar nodes), MT nodes (e.g., the IAB nodes 410, or similar nodes)) may be capable of operating in a full duplex mode, in which the one or more of the network nodes transmit downlink signals and receive uplink signals simultaneously. Aspects of full duplex operation are described in more detail below in connection with FIGS. 5A-5D.

As indicated above, FIG. 4 is provided as an example. Other examples may differ from what is described with regard to FIG. 4.

Figure 5:
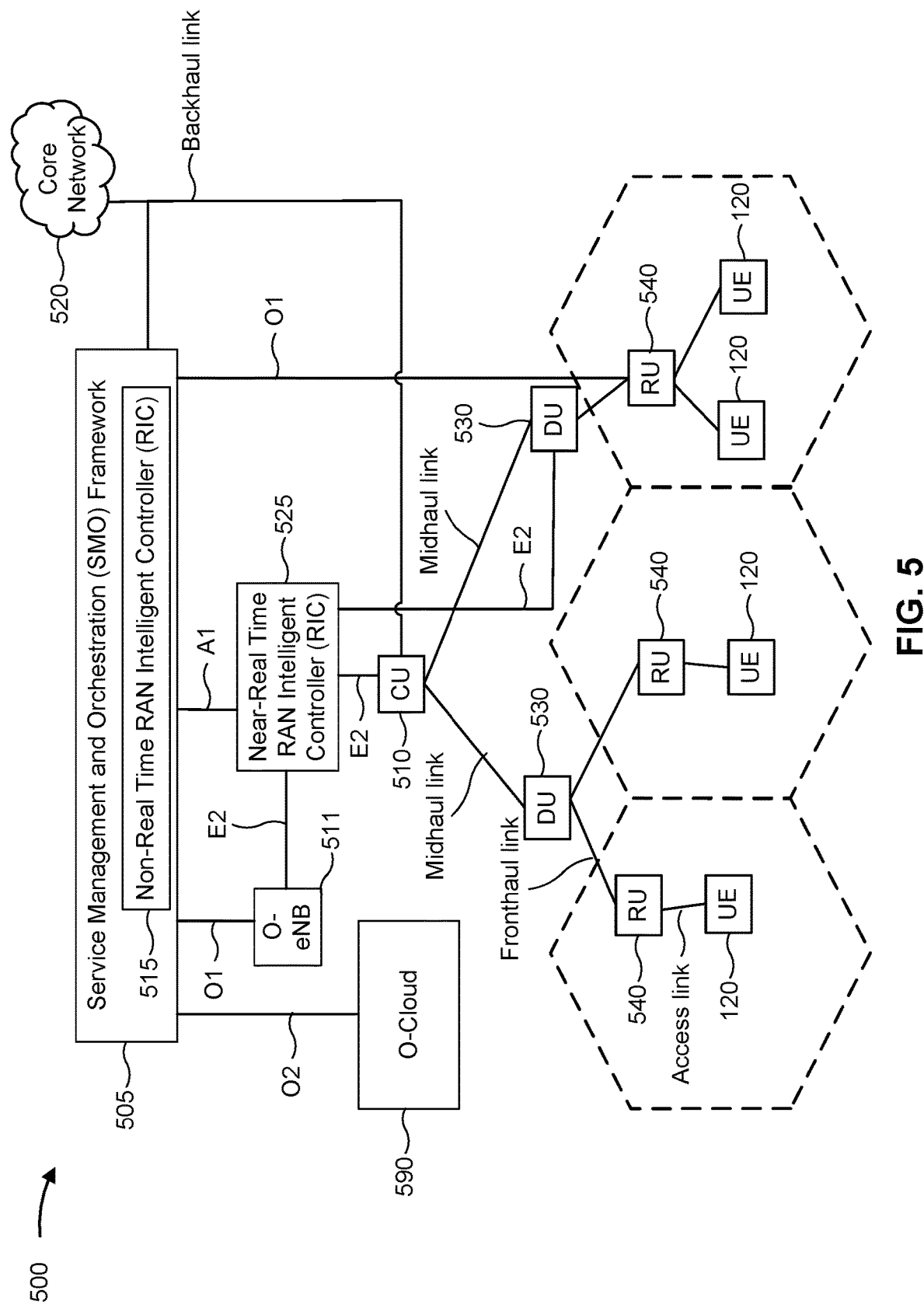
FIG. 5 is a diagram illustrating an example disaggregated base station architecture, in accordance with the present disclosure.

FIG. 5 is a diagram illustrating an example disaggregated base station architecture 500, in accordance with the present disclosure. The disaggregated base station architecture 500 may include a CU 510 that can communicate directly with a core network 520 via a backhaul link, or indirectly with the core network 520 through one or more disaggregated control units (such as a Near-Real Time (Near-RT) RAN Intelligent Controller (RIC) 525 via an E2 link, or a Non-Real Time (Non-RT) RIC 515 associated with a Service Management and Orchestration (SMO) Framework 505, or both). A CU 510 may communicate with one or more DUs 530 via respective midhaul links, such as through F1 interfaces. Each of the DUs 530 may communicate with one or more RUs 540 via respective fronthaul links. Each of the RUs 540 may communicate with one or more UEs 120 via respective RF access links. In some implementations, a UE 120 may be simultaneously served by multiple RUs 540.

Each of the units, including the CUs 510, the DUs 530, the RUs 540, as well as the Near-RT RICs 525, the Non-RT RICs 515, and the SMO Framework 505, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 510 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 510. The CU 510 may be configured to handle user plane functionality (for example, Central Unit-User Plane (CU-UP) functionality), control plane functionality (for example, Central Unit-Control Plane (CU-CP) functionality), or a combination thereof. In some implementations, the CU 510 can be logically split into one or more CU-UP units and one or more CU-CP units. A CU-UP unit can communicate bidirectionally with a CU-CP unit via an interface, such as the E1 interface when implemented in an O-RAN configuration. The CU 510 can be implemented to communicate with a DU 530, as necessary, for network control and signaling.

Each DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 530 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which may also be referred to as a module) can be implemented with an interface configured to communicate signals with other layers (and modules) hosted by the DU 530, or with the control functions hosted by the CU 510.

Each RU 540 may implement lower-layer functionality. In some deployments, an RU 540, controlled by a DU 530, may correspond to a logical node that hosts radio frequency (RF) processing functions or low-PHY layer functions, such as performing an FFT, performing an iFFT, digital beamforming, or PRACH extraction and filtering, among other examples, based at least in part on a functional split (for example, a functional split defined by the 3GPP), such as a lower layer functional split. In such an architecture, each RU 540 can be operated to handle over the air (OTA) communication with one or more UEs 120. In some implementations, real-time and non-real-time aspects of control and user plane communication with the RU(s) 540 can be controlled by the corresponding DU 530. In some scenarios, this configuration can enable each DU 530 and the CU 510 to be implemented in a cloud-based RAN architecture, such as a vRAN architecture.

The SMO Framework 505 may be configured to support RAN deployment and provisioning of non-virtualized and virtualized network elements. For non-virtualized network elements, the SMO Framework 505 may be configured to support the deployment of dedicated physical resources for RAN coverage requirements, which may be managed via an operations and maintenance interface (such as an O1 interface). For virtualized network elements, the SMO Framework 505 may be configured to interact with a cloud computing platform (such as an open cloud (O-Cloud) platform 590) to perform network element life cycle management (such as to instantiate virtualized network elements) via a cloud computing platform interface (such as an O2 interface). Such virtualized network elements can include, but are not limited to, CUs 510, DUs 530, RUs 540, non-RT RICs 515, and Near-RT RICs 525. In some implementations, the SMO Framework 505 can communicate with a hardware aspect of a 4G RAN, such as an open eNB (O-eNB) 511, via an O1 interface. Additionally, in some implementations, the SMO Framework 505 can communicate directly with each of one or more RUs 540 via a respective O1 interface. The SMO Framework 505 also may include a Non-RT RIC 515 configured to support functionality of the SMO Framework 505.

The Non-RT RIC 515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 525. The Non-RT RIC 515 may be coupled to or communicate with (such as via an A1 interface) the Near-RT RIC 525. The Near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the Near-RT RIC 525.

In some implementations, to generate AI/ML models to be deployed in the Near-RT RIC 525, the Non-RT RIC 515 may receive parameters or external enrichment information from external servers. Such information may be utilized by the Near-RT RIC 525 and may be received at the SMO Framework 505 or the Non-RT RIC 515 from non-network data sources or from network functions. In some examples, the Non-RT RIC 515 or the Near-RT RIC 525 may be configured to tune RAN behavior or performance. For example, the Non-RT RIC 515 may monitor long-term trends and patterns for performance and employ AI/ML models to perform corrective actions through the SMO Framework 505 (such as reconfiguration via an O1 interface) or via creation of RAN management policies (such as A1 interface policies).

As indicated above, FIG. 5 is provided as an example. Other examples may differ from what is described with regard to FIG. 5.

FIGS. 6A-6D are diagrams illustrating examples 600, 610, 620, 630 of full duplex (FD) communication in accordance with the present disclosure. An FD communication is a communication that utilizes overlapped time resources at a single node (such as a UE or a base station) for transmission and reception. For example, a UE or a base station may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indicator (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG).

The example 600 of FIG. 6A includes a UE1 602 and two network nodes (e.g., TRPs) 604-1, 604-2, wherein the UE1 602 is sending uplink transmissions to the network node 604-1 and is receiving downlink transmissions from the network node 604-2. In some aspects, the network node 604 described in connection with FIG. 6 (sometimes referred to as a network node) may be a base station (e.g., the base station 110 described in connection with FIGS. 1 and 2 and/or one of the base stations 310, 335, 345 described in connection with FIG. 3), a TRP associated with (e.g., managed by) a base station or other network node, one of the IAB donor 405 and/or the IAB nodes 410 described in connection with FIG. 4, or a similar network node. In some aspects, the UEs 602 described in connection with FIG. 6 may be the UE 120 described in connection with FIGS. 1, 2, and 4, one of the UEs 320, 355 described in connection with FIG. 3, or a similar UE. In the example 600 of FIG. 6A, FD is enabled for the UE1 602, but not for the network nodes 604-1, 604-2. Thus, the network nodes 604-1 and 604-2 are half duplex (HD) network nodes.

The example 610 of FIG. 6B includes two UEs, UE1 602-1 and UE2 602-2, a network node 604-1, and a network node 604-2. The UE1 602-1 is receiving a downlink transmission from the network node 604-1 and the UE2 602-2 is transmitting an uplink transmission to the network node 604-1. In the example 610 of FIG. 6B, FD is enabled for the network node 604-1, but not for the UE1 602-1 and UE2 602-2. Thus, the UE1 602-1 and UE2 602-2 are half duplex UEs.

The example 620 of FIG. 6C includes a UE1 602 and a network node 604, wherein the UE1 602 is receiving a downlink transmission from the network node 604 and the UE1 602 is transmitting an uplink transmission to the network node 604. In the example 620 of FIG. 6C, FD is enabled for both the UE1 602 and the network node 604. In the example 620 of FIG. 6C, the UE1 602 and the network node 604 communicate using a beam pair. A beam pair may include a downlink beam and an uplink beam. For example, a UE1 602 may use a beam pair that includes a downlink beam (that is, a receive beam) at the UE1 602 and an uplink beam (that is, a transmit beam) at the UE1 602 to communicate with the network node 604. The network node 604 may use a downlink beam (that is, a transmit beam) at the network node 604 to transmit communications received via the UE1 602's downlink beam, and may use an uplink beam (that is, a receive beam) at the network node 604 to receive communications transmitted via the UE1 602's uplink beam.

The example 630 of FIG. 6C includes a base station 110 and two network nodes 604-1 and 604-2 associated with a cell (such as, e.g., a cell 102 described in connection with FIG. 1). The network nodes 604-1 and 604-2 may be either co-located (e.g., located at the same device, such as at the base station 110 or other device), or may be non-co-located (e.g., located apart from one another and/or from the base station 110, and thus may be standalone devices).

In FIGS. 6A-6D, interference is indicated by dashed lines. Interference can occur between network nodes of examples 600, 610, 620, 630 (referred to as CLI). In FIG. 6A, network node 604-2's downlink transmission interferes with network node 604-1's uplink transmission. In FIG. 6B, network node 604-1's uplink reception may be subject to interference from a transmission by a network node 604-2. CLI between network nodes 604 is referred to herein as inter-network node CLI. In some examples in FIG. 6B, UE2 602-2's uplink transmission may interfere with UE1 602-1's downlink transmission (not shown). Similarly, in FIG. 6D, UE2 602-2's uplink transmission interferes with UE1 602-1's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 602 (from an uplink transmission to a downlink reception) and at a network node 604 (from a downlink transmission to an uplink reception) are shown in FIG. 6C. It should be noted that the above-described CLI and self-interference conditions can occur in HD deployments and in FD deployments.

A network node (e.g., one of network devices 604) operating in a FD mode may result in certain benefits, such as latency reduction because downlink transmissions may be transmitted in uplink slots or the like, as well as spectrum efficiency enhancement, more efficient resource utilization, and coverage enhancement. Detection of CLI, such as inter-network node CLI (as illustrated in FIG. 6B) may be important for FD operation, since a network node can be subject to interference from other network nodes thereby impacting operation of the network node. Techniques described herein provide configuration of transmission windows and reception windows for inter-network node CLI measurement reference signal (RS) transmission and measurement. At an FD network node (such as the network node 604-1 of FIG. 6B), transmission windows may not overlap reception windows, as described in more detail below.

As indicated above, FIGS. 6A-6D are provided as one or more examples. Other examples may differ from what is described with regard to FIGS. 6A-6D.

Figure 7:
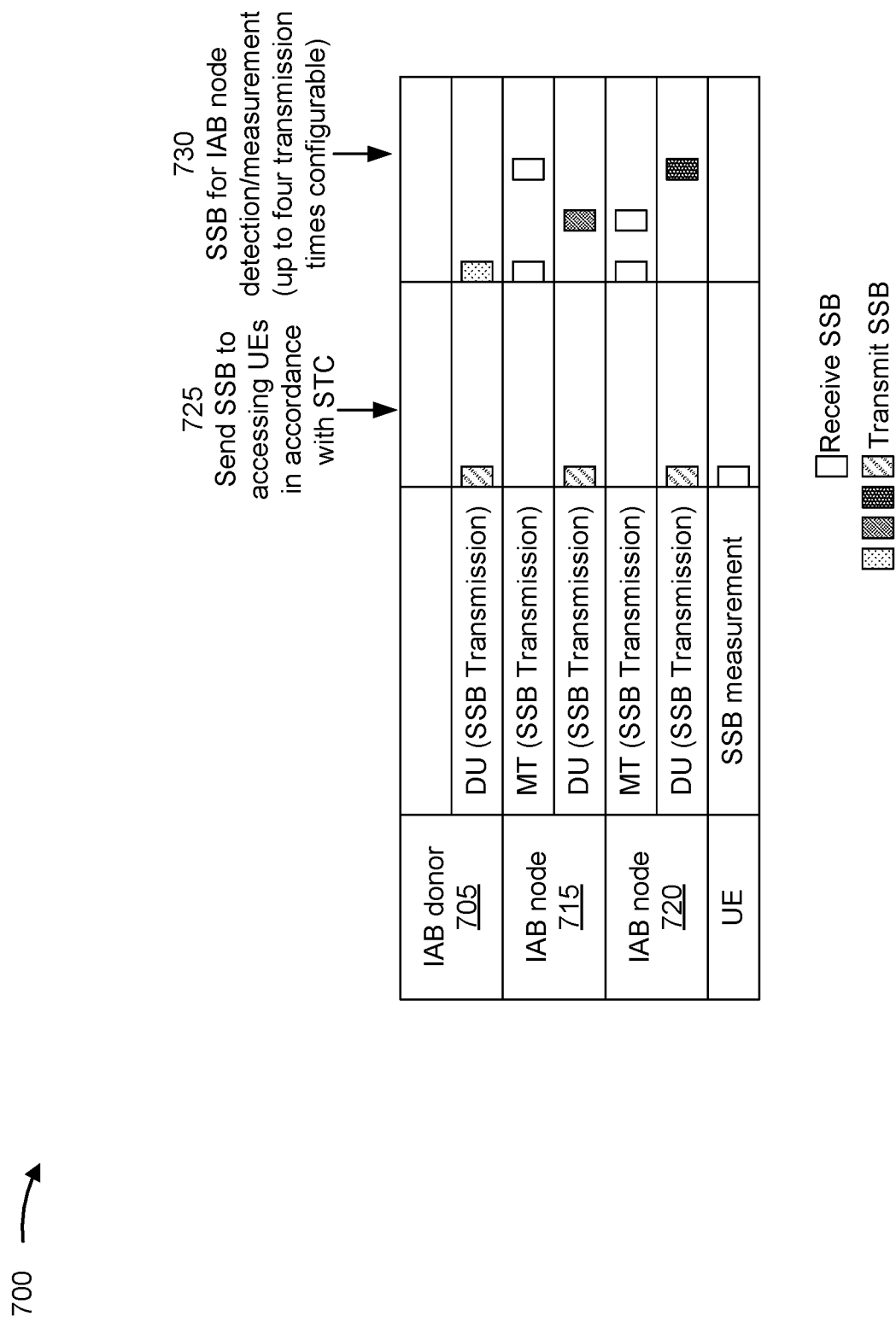
FIG. 7 is a diagram illustrating an example of configuration and signaling of synchronization signal blocks (SSBs) between half-duplex IAB nodes, in accordance with the present disclosure.

FIG. 7 is a diagram illustrating an example 700 of configuration and signaling of synchronization signal blocks (SSBs) between half-duplex IAB nodes, in accordance with the present disclosure. As shown, example 700 includes an IAB donor 705 (e.g., IAB donor 405) and IAB nodes 715 and 720 (e.g., IAB node 410). Furthermore, example 700 includes a UE (e.g., UE 120). In a given column of the table of example 700, the horizontal dimension represents time. A row of the table corresponds to a DU function, MT function, or UE function of the corresponding entity 705, 715, 720, or the UE.

An SSB may be used for detection of IAB donors and/or nodes, such as for initial access (such as of a UE), configuration or implementation of an IAB network, discovery of IAB nodes, and inter-network node CLI measurement. An SSB transmission configuration (STC) may indicate a configuration for a network node (such as IAB donor 705, or IAB node 715 or 720) to transmit an SSB. For example, an STC may indicate an SSB center frequency, an SSB subcarrier spacing, an SSB transmission periodicity, an SSB transmission timing offset (which may be in terms of half frames, in some examples), an index of one or more SSBs to transmit, and a physical cell identifier associated with the STC.

A network node (e.g., an IAB node 715 or 720, or a UE) may monitor for or measure an SSB based at least in part on an SSB-based radio resource monitoring measurement timing configuration (SMTC). An SMTC may indicate a window in which the network node is to monitor for or measure an SSB. Such a window is referred to herein as a reception window. An SMTC may indicate a periodicity associated with a reception window, a timing offset associated with an SMTC window, a duration associated with an SMTC window, a set of physical cell identifiers to be measured, and/or one or more SSBs (e.g., indexes of SSBs) to be measured.

In example 700, as shown by reference number 725, the IAB donor 705, and the IAB nodes 715 and 720, may transmit SSBs (in accordance with an STC) which may be monitored by the UE (in accordance with an SMTC). For example, DUs of the IAB donor 705, and the IAB nodes 715 and 720, may be configured to transmit the SSBs. As shown by reference number 730, the IAB donor 705, and the IAB nodes 715 and 720, may transmit SSBs (in accordance with respective STCs) for IAB node detection. For example, DUs of the IAB donor 705, and the IAB nodes 715 and 720, may be configured to transmit the SSBs. MTs of the IAB nodes 715 and 720 may be configured to monitor for the SSBs in accordance with one or more SMTCs. For example, up to four SSB transmission times may be configurable for transmission of an SSB for IAB node detection or measurement. This constraint may introduce difficulties in dense cell deployments, since a CU (e.g., an IAB donor 705) may have to configure STCs for cells in a large area without initially knowing which cells are in range of one another.

An IAB STC (e.g., an STC associated with an IAB node or an IAB donor) can be configured at an IAB node's DU or an IAB donor's DU for an IAB node's MT (e.g., a neighbor IAB node's MT) to measure. An IAB STC can be different from those for UE initial access. An IAB STC information element may include STC information (e.g., an STC) of an IAB node's DU or an IAB donor's DU. Neighbor IAB node MTs may perform discovery and measurements of the IAB node's DU or the IAB donor's DU based at least in part on SSBs transmitted in an STC window identified by the STC information. For example, an IAB node MT may perform discovery and measurement in an SMTC window corresponding to an STC window of a DU, where the STC window is identified by the STC information. There may be, at most, 5 STC configurations. This may include 1 STC configuration for access (such as by UEs) and 4 STC configurations for backhaul (such as for discovery or CLI measurement of IAB donors and/or nodes). The STC information may be transmitted by an IAB donor's CU to an IAB node's DU or an IAB donor's DU via an F1 interface. For example, IAB information of an IAB donor's CU may be transmitted as IAB STC information. The STC information can also be sent by an IAB node's DU or an IAB donor's DU to an IAB donor's CU, via an F1 SETUP REQUEST to a served cell information element to an IAB information IAB-DU element to IAB STC information.

In some examples, an SMTC information element (for example, an SSB-MTC3-r16 information element) may be used to indicate for an IAB node's MT to measure a neighbor IAB node DU or IAB donor DU SSB transmission. For example, this information element may be different from one used for UE initial access. If an SMTC list is present, for cells indicated in a pci-List parameter in each SSB-MTC3 element of the SMTC list in the same MeasObjectNR, the IAB node's MT may set up an additional synchronization signal (SS) block measurement timing configuration (also abbreviated SMTC) in accordance with a received periodicityAndOffset parameter (such as using the same condition as smtc1 to identify a system frame number and subframe for an SMTC occasion) in each SSB-MTC3 configuration, and may use duration and ssb-ToMeasure parameters from each SSB-MTC3 configuration.

In some aspects, a network node (such as one or more of the network nodes or central network entities described herein) may be configured for remote interference management (RIM). RIM may involve the transmission of an RS on a RIM transmission resource. A RIM transmission resource (which may be referred to herein as a transmission window) may be defined by an occasion within a RIM RS period, a frequency location, and a sequence. A network node may be allocated with one or more base station set identifiers, where each base station set identifier is mapped to one RIM resource. An occasion may be defined as the last X symbols before the end of a downlink transmission, where X is an RS duration. Code division multiplexed (CDMed) RSs can be configured in the same occasion. A central network entity, such as an OAM, may configure reception windows (sometimes referred to as RIM reception occasions or a monitoring window) per network node. The central network entity may activate or deactivate monitoring of one or more reception windows. There may be no requirement that reception windows and transmission windows be non-overlapped in time. For example, a monitoring occasion may be allowed to overlap a RIM transmission resource in time, which may be problematic for an FD network node.

As indicated above, FIG. 7 is provided as an example. Other examples may differ from what is described with regard to FIG. 7.

The above-described techniques may have certain limitations for a network node operating in an FD mode. For example, RIM based configurations may not mandate that reception windows and transmission windows be non-overlapped, which can cause self-interference for inter-network node CLI measurement. As another example, the techniques described above for configuration of IAB donor/node SSB based CLI measurement (as described in connection with FIG. 7) are constrained to 4 transmission times, which may be insufficient in dense deployments. Thus, traditional techniques for inter-network node CLI measurement may cause self-interference (thereby degrading quality of CLI measurement) or may be constrained such that they are insufficient for dense network deployments.

Figure 8:
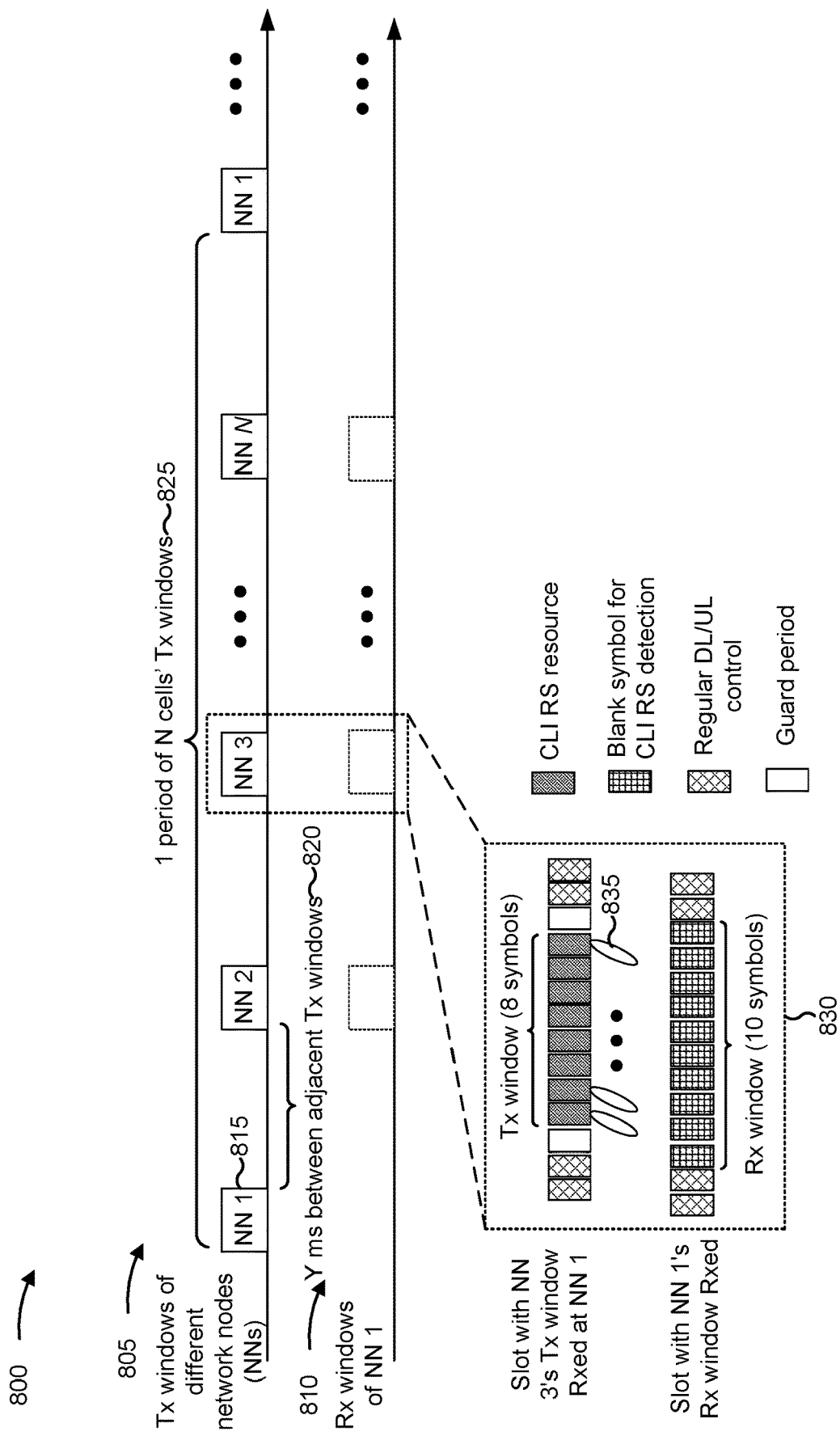
FIG. 8 is a diagram illustrating an example of configuration of transmission windows and reception windows for inter-network node (e.g., inter-gNB) crosslink interference (CLI) measurement reference signal (RS) transmission and measurement, in accordance with the present disclosure.

FIG. 8 is a diagram illustrating an example 800 of configuration of transmission windows and reception windows for inter-network node (e.g., inter-gNB) CLI measurement RS transmission and measurement, in accordance with the present disclosure. Techniques and apparatuses described herein enable the configuration of separate transmission windows and reception windows for a group of network nodes. The transmission windows for the group of network nodes are shown by reference number 805. The reception windows of a single network node of the group of network nodes (illustrated as Network Node 1) are shown by reference number 810. It can be seen that a transmission window 815 of network node 1 does not overlap with any of the reception windows of network node 1. Thus, self-interference at network node 1 is avoided, which improves accuracy of CLI measurement.

As further shown, there may be N network nodes included in the group of network nodes. Each network node may be configured with a respective transmission window. Network node 1 may be configured with a plurality of reception windows. Each transmission window may be associated with a corresponding reception window, of the plurality of reception windows, since each transmission window overlaps one reception window of the plurality of reception windows.

As shown by reference number 820, each transmission window may be separated by a length of time. In example 800, there are Y ms between each transmission window. In some aspects, the start of a first transmission window may be separated from the start of a next transmission window by Y ms. Y may be configurable, as described in more detail elsewhere herein. Furthermore, a given network node's transmission windows may be associated with a period, indicated by reference number 825.

Reference number 830 shows a granular view of resources (e.g., symbols, in some examples) of a transmission window and a reception window. A transmission window of network node 3 is shown, as well as an associated reception window of network node 1. CLI measurement RS transmission resources are shown by a dotted fill. Symbols associated with reception of a CLI measurement RS are shown by a square patterned fill. Symbols associated with other communications, such as control communications, are shown by a diamond hatched fill. A guard period for network node 3 to prepare for transmission of a CLI measurement RS, and to return to transmission of other communications, is shown by a white fill on each side of the CLI measurement RS transmission resources. As shown by reference number 835, in example 800, network node 3 transmits using a same beam on each CLI measurement RS transmission resource of a transmission window. For example, for a periodic transmission window, a network node may transmit using one beam per occasion of the transmission window in accordance with a first configuration (e.g., where a first occasion of the transmission window uses a different beam than a second occasion of the transmit window). In some other aspects, network node 3 may transmit using a plurality of beams (such as a different beam on each CLI measurement RS transmission resource, or a first beam on a first group of CLI measurement RS transmission resources and a second beam on a second group of CLI measurement RS transmission resources). Transmission or reception using a plurality of beams in a single window (e.g., a transmission window or a reception window) is referred to herein as beamsweeping. For example, a network node may use beamsweeping for transmission in one or more transmission windows.

As shown, there are 10 symbols for CLI measurement RS detection within the reception window. The number of symbols for CLI measurement RS detection within a given reception window may be configurable. In some aspects, network node 1 may perform beamsweeping in the reception window. For example, network node 1 may generate a plurality of different receive beams within the reception window (such as a different beam on each resource associated with reception of a CLI measurement RS, or a first beam on a first group of resources associated with reception of a CLI measurement RS and a second beam on a second group of resources associated with reception of a CLI measurement RS). Thus, a network node may use beamsweeping for reception of reference signaling in a particular reception window. In some aspects, if a transmission window uses beamsweeping for a group of resources, a corresponding reception window may use a single beam for the group of resources. In some aspects, if a transmission window uses a single beam for a group of resources, a corresponding reception window may use beamsweeping for the group of resources. In some aspects, a periodic reception window may use one beam for reception of reference signaling per occasion of the reception window (wherein a first occasion of the reception window can be associated with a different beam than a beam associated with a second occasion of the reception window).

The arrangement shown in the example 800 may provide decreased overhead relative to some other arrangements, such as an arrangement shown by the example 700. For example, if N=7, Y=100 ms, there are 64 SSB (e.g., CLI measurement RS) beams per network node, and if there is 1 transmit beam per transmission window and 1 receive beam per reception window, the example 800 may be associated with an overhead of N×Slot duration/Y=0.88%. A full SSB beam sweep latency can be computed as Y×64^2 (since there are 64 transmit beams and 64 receive beams), which may be equal to a 6.8 minute latency.

As indicated above, FIG. 8 is provided as an example. Other examples may differ from what is described with regard to FIG. 8.

Figure 9:
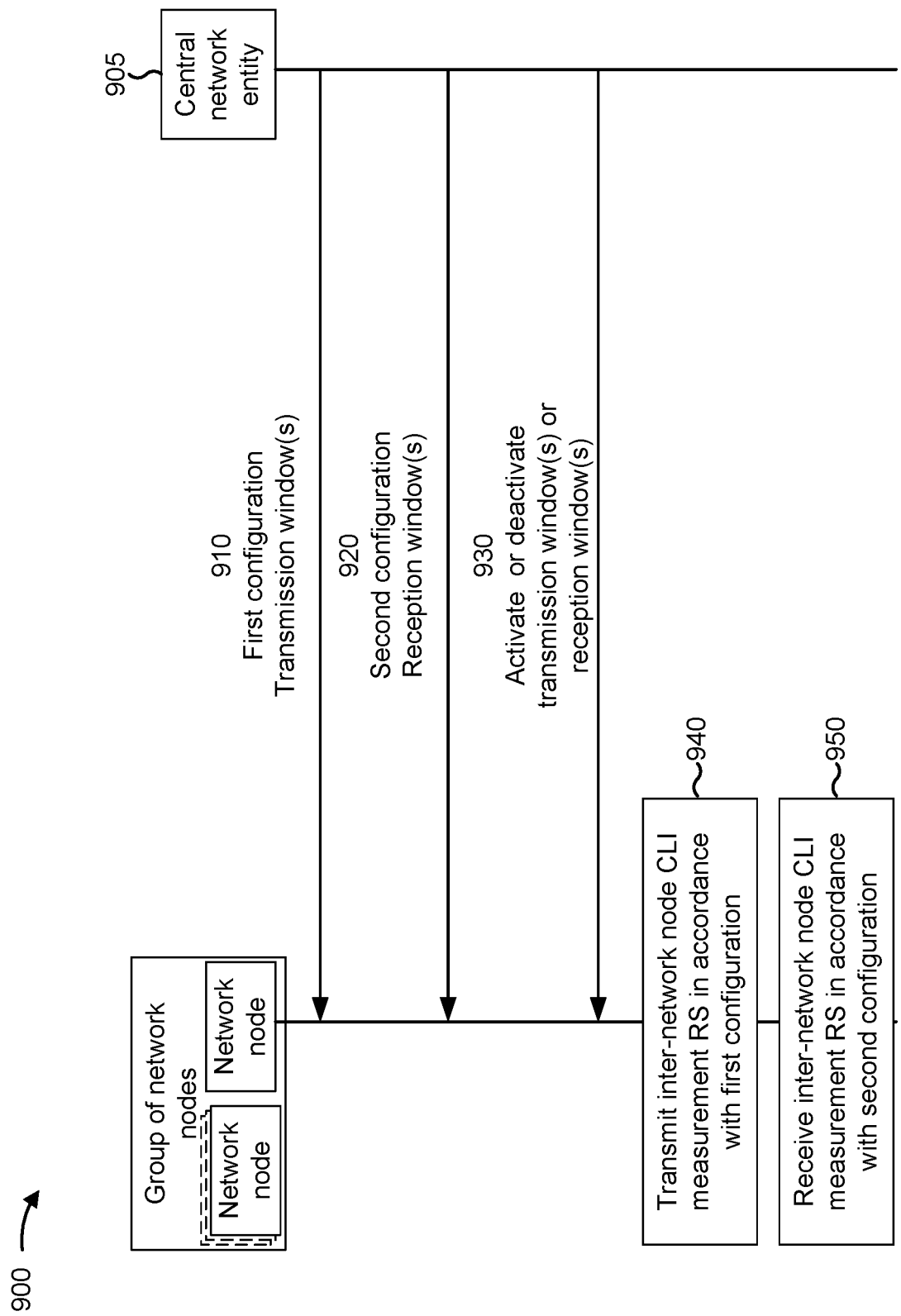
FIG. 9 is a diagram illustrating an example of signaling associated with configuration of transmission windows and reception windows for inter-network node CLI measurement reference signaling, in accordance with the present disclosure.

FIG. 9 is a diagram illustrating an example 900 of signaling associated with configuration of transmission windows and reception windows for inter-network node CLI measurement reference signaling, in accordance with the present disclosure. As shown, example 900 includes a central network entity 905 (e.g., base station 110, network controller 130, base station 310, anchor base station 335, non-anchor base station 345, IAB donor 405, CU 510, DU 530, RU 540, network node 604) and a group of network nodes (e.g., base station 110, base station 310, non-anchor base station 345, IAB node 410, an MT function of an IAB node 410 or a base station 110, a DU function of an IAB node 410 or a base station 110, DU 530, network node 604) including a network node. The description of example 900 focuses on the above-mentioned network node for clarity, so that signaling between the group of network nodes and the central network entity 905 can be clearly explained with reference to a single network node. It should be understood that signaling described as being between the network node and the central network entity 905 can also occur between any other network node of the group of network nodes, and the central network entity 905. For example, the operations described with regard to example 900 can be performed by any network node of the group of network nodes.

The description of example 900 refers to "inter-network node CLI measurement reference signaling." "Inter-network node CLI measurement reference signaling" includes the transmission of one or more reference signals in a transmission window. "Receiving inter-network node CLI measurement reference signaling" includes monitoring for (e.g., determining whether a reference signal is received), measuring (e.g., determining an interference measurement), or receiving one or more reference signals in a resource of a reception window. In some aspects, the one or more reference signals may include one or more SSBs. In some aspects, the one or more reference signals may include a reference signal other than an SSB.

As used herein, "network node" can refer to an IAB node, a DU, a base station, a TRP, an RU, or the like. Furthermore, "network node" may be used to refer to a cell provided by a network node. For example, the techniques described herein can be used to configure a first configuration and a second configuration, and to perform reference signaling and reception of reference signaling, for a cell of a network node. For example, reference number 910 may involve the configuration of a first configuration for a cell. Reference number 920 may involve the configuration of a second configuration for the cell. Reference number 930 may involve activation or deactivation of a first configuration or a second configuration for a cell. Reference numbers 940 and 950 may involve transmission or reception of reference signaling by the cell.

As shown by reference number 910, the central network entity 905 may configure the network node with a first configuration. For example, the central network entity 905 may transmit (e.g., directly or via a radio unit) configuration information to the network node indicating the first configuration. In some aspects, the central network entity 905 may transmit the first configuration via RRC signaling, MAC signaling, an F1 interface, or the like. In some aspects, the first configuration may be based at least in part on information provided by the network node. For example, the network node may transmit, to the central network entity 905, information indicating one or more parameters of the first configuration. In such examples, the central network entity 905 may generate the first configuration based at least in part on the one or more parameters.

The first configuration may indicate one or more transmission windows for inter-network node CLI measurement reference signaling. "One or more transmission windows" can refer to a periodic transmission window, or to a single instance of a transmission window. For example, "a transmission window" can be a periodic transmission window with multiple occasions. As another example, "a transmission window" can be a single occasion of a periodically occurring set of transmission windows.

The first configuration may indicate a set of parameters. In some aspects, the set of parameters may indicate a duration of the transmission window. For example, the duration can be expressed in terms of resources, such as a number of symbols, a number of slots, or the like. In some aspects, the set of parameters may indicate a periodicity of the transmission window. For example, the set of parameters may indicate a period at which the transmission window (or multiple transmission windows) occurs. In some aspects, the set of parameters may indicate a time offset associated with the transmission window. For example, the set of parameters may indicate a time offset relative to a reference time, and the transmission window (e.g., each occasion of the transmission window) may be positioned based at least in part on the time offset. In some aspects, the set of parameters may indicate a frequency location associated with the transmission window. For example, the set of parameters may indicate a frequency location parameter center frequency of the transmission window, a subcarrier associated with the transmission window, a resource block associated with the transmission window, a subchannel associated with the transmission window, a resource pool associated with the transmission window, or the like.

In some aspects, the set of parameters may indicate a reference signal resource of the transmission window. Examples of how a reference signal resource is indicated are described below. For example, the set of parameters may indicate a reference signal resource identifier, such as an SSB index, associated with the reference signal resource. In some aspects, the set of parameters may indicate a time and frequency location of the reference signal resource, such as a start and length indicator value, or one or more of the frequency location parameters described above. In some aspects, the set of parameters may indicate a sequence identifier of the reference signal resource. For example the set of parameters may indicate a sequence used to generate an inter-network node CLI measurement reference signal transmitted on the reference signal resource. In some aspects, the set of parameters may indicate a subcarrier spacing of the reference signal resource, such as using a numerology index or another form of information indicating a subcarrier spacing. In some aspects, the set of parameters may indicate transmit beam information associated with the reference signal resource. For example, the set of parameters may indicate quasi-co-location information associated with the reference signal resource, such as a source reference signal, a quasi-co-location parameter (e.g., Doppler spread, Doppler shift, spatial transmit parameter, spatial receive parameter, or the like), an SSB index, or the like. In some examples, the transmit beam information may indicate a set of SSB indexes corresponding to a set of transmit beams for the transmission window (e.g., the network node is to transmit 4 CLI measurement RS resources in a transmission window with transmit beams identical to those for the network node's SSBs #5, 10, 15, and 20). In some aspects, the set of parameters may indicate a power parameter associated with the reference signal resource. For example, the set of parameters may indicate an absolute power value or may indicate an offset relative to another power parameter (such as a transmit power parameter for an SSB or a physical downlink shared channel). In some aspects, the set of parameters may indicate repetition information associated with the reference signal resource. For example, the set of parameters may indicate a number of reference signal resources (e.g., adjacent reference signal resources) or a group of reference signal resources that are to have an identical transmit beam, an identical sequence identifier, an identical subcarrier spacing, a phase continuity condition (e.g., such that each of the reference signal resources can be received using the same phase determination, which may be based at least in part on a phase tracking reference signal), or a combination thereof.

In some aspects, the set of parameters may be the same for each transmission window configured for the network node (e.g., each occasion of a periodic transmission window, or each of multiple transmission windows of a periodic configuration of a transmission window). In some other aspects, the set of parameters may be different across transmission windows. For example, the set of parameters may be based at least in part on a pattern (e.g., a first set of transmit beams are used in a first transmission window, a second set of transmit beams are used in a second transmission window, the first set of transmit beams are used in a third transmission window, the second set of transmit beams are used in a fourth transmission window, and so on).

In some aspects, the set of parameters may be explicitly signaled to the network node, such as to a gNB-DU of the network node. Additionally, or alternatively, the network node may determine one or more parameters of the set of parameters. For example, the network node (e.g., the gNB-DU) may implicitly derive one or more parameters based at least in part on a rule (e.g., a reference signal resource and identifier may be derived from a cell identifier associated with the reference signal transmitting network node). Thus, the network node may determine one or more parameters that are implicitly indicated by information associated with the network node.

As shown by reference number 920, the central network entity 905 may configure the network node with a second configuration. For example, the central network entity 905 may transmit (e.g., directly or via a radio unit) configuration information to the network node indicating the second configuration. In some aspects, the central network entity 905 may transmit the second configuration via RRC signaling, MAC signaling, an F1 interface, or the like. In some aspects, the second configuration may be based at least in part on information provided by the network node. For example, the network node may transmit, to the central network entity 905, information indicating one or more parameters of the second configuration. In such examples, the central network entity 905 may generate the second configuration based at least in part on the one or more parameters.

The second configuration may indicate one or more reception windows for inter-network node CLI measurement reference signaling. "One or more reception windows" can refer to a periodic reception window, or to a single instance of a reception window. For example, "a reception window" can be a periodic reception window with multiple occasions. As another example, "a reception window" can be a single occasion of a periodically occurring set of reception windows.

The second configuration may indicate a set of parameters. In some aspects, the set of parameters may indicate a duration of the reception window. For example, the duration can be expressed in terms of resources, such as a number of symbols, a number of slots, or the like. In some aspects, the set of parameters may indicate a periodicity of the reception window. For example, the set of parameters may indicate a period at which the reception window (or multiple reception windows) occurs. In some aspects, the set of parameters may indicate a time offset associated with the reception window. For example, the set of parameters may indicate a time offset relative to a reference time, and the reception window (e.g., each occasion of the reception window) may be positioned based at least in part on the time offset. In some aspects, the set of parameters may indicate a frequency location associated with the reception window. For example, the set of parameters may indicate a frequency location parameter center frequency of the reception window, a subcarrier associated with the reception window, a resource block associated with the reception window, a subchannel associated with the reception window, a resource pool associated with the reception window, or the like.

In some aspects, the set of parameters may indicate one or more RS sequence identifiers associated with inter-network node CLI measurement reference signaling in a reception window. For example, the set of parameters may indicate a set of RS sequence identifiers that the network node is to measure in a transmission window, which may reduce sequence detection error rate. In some aspects, the set of parameters may indicate one or more parameters associated with an RS sequence identifier of the one or more RS sequence identifiers. For example, the set of parameters may indicate one or more parameters associated with each RS sequence identifier of the one or more RS sequence identifiers. In some aspects, the one or more parameters, for an RS sequence identifier, may indicate a transmitter identifier associated with the reference signal sequence identifier (e.g., a transmitting cell identifier, a gNB-DU identifier, or the like), a resource associated with the reference signal sequence identifier (such as a number of RS resources, a time location of the resource, a frequency location of the resource, or the like, where time locations and frequency locations are described elsewhere herein), receive beam information associated with the reference signal sequence identifier (where receive beam information can include a source reference signal, a quasi-co-location parameter (e.g., Doppler spread, Doppler shift, spatial transmit parameter, spatial receive parameter, or the like), an SSB index, or the like), a transmit power associated with the reference signal sequence identifier (such as an absolute transmit power or a transmit power offset), or repetition information associated with the reference signal sequence identifier. Thus, the central network entity 905 may provide parameters associated with receiving inter-network node CLI measurement reference signaling, which enables the network node to efficiently receive and/or measure such reference signaling, thereby improving accuracy of CLI measurement and improving network communications.

In some aspects, the set of parameters may be the same for each reception window configured for the network node (e.g., each occasion of a periodic reception window, or each of multiple reception windows of a periodic configuration of a reception window). In some other aspects, the set of parameters may be different across reception windows. For example, the set of parameters may be based at least in part on a pattern (e.g., a first set of receive beams are used in a first reception window, a second set of receive beams are used in a second reception window, the first set of receive beams are used in a third reception window, the second set of receive beams are used in a fourth reception window, and so on).

In some aspects, the set of parameters associated with the one or more reception windows may be explicitly signaled to the network node, such as to a gNB-DU of the network node. Additionally, or alternatively, the network node may determine one or more parameters of the set of parameters. For example, the network node (e.g., the gNB-DU) may implicitly derive one or more parameters based at least in part on a rule (e.g., a transmitting cell identifier of a transmitting network node associated with a reception window may be derived from a reference signal location and identifier). Thus, the network node may determine one or more parameters that are implicitly indicated by information associated with the network node.

As mentioned above in connection with FIG. 8, the central network entity 905 may configure transmission windows and reception windows of the group of network nodes such that a transmission window and a reception window at a given network node do not overlap each other. For example, the central network entity 905 may configure a first network node with one or more transmission windows and a plurality of reception windows. Each reception window, of the plurality of reception windows, may be associated with a respective network node of the group of network nodes. The central network entity 905 may configure a second network node with a reception window that overlaps, in time, with the one or more transmission windows (e.g., with one of the one or more transmission windows, or with occasions of a periodic transmission window of the one or more transmission windows). For example, the central network node may configure, for each network node of the group of network nodes other than the first network node, reception windows that overlap, in time, the one or more transmission windows of the first network node. For example, where there are 3 network nodes, the central network node may configure a transmission window of the first network node, may configure a first reception window of the second network node to overlap the transmission window, and may configure a second reception window of the third network node to overlap the transmission window. Thus, the first reception window and the second reception window are associated with the first network node based at least in part on the first network node having a transmission window that overlaps the first reception window and the second window.

In some aspects, network node i out of a group of N network nodes may be configured, by a first configuration, with a transmission window i. Network node i may also be configured, by a second configuration, with reception windows [1 . . . i−1, i+1 . . . n] (since network node i is not configured with a reception window that overlaps transmission window i). Each reception window, of reception windows [1 . . . i−1, i+1 . . . n], may overlap a transmission window [1 . . . i−1, i+1 . . . n] of a corresponding network node [1 . . . i−1, i+1 . . . n]. It should be noted that i can be any value between and including 1 and n.

In some aspects, as shown by reference number 930, the central network entity 905 may provide signaling (e.g., directly or via a radio unit) activating or deactivating a first configuration or a second configuration. For example, the signaling can include RRC signaling, MAC signaling, F1 signaling, or the like. In some aspects, the central network entity 905 may configure multiple first configurations or multiple second configurations and may activate or deactivate a selected first configuration or second figuration out of the multiple first configurations or multiple second configurations.

As shown by reference number 940, the network node may transmit inter-network node CLI measurement reference signaling in accordance with the first configuration. For example, the network node may transmit one or more reference signals (e.g., an SSB and/or or another form of RS) in one or more transmission windows in accordance with the set of parameters indicated by the first configuration.

As shown by reference number 950, the network node may receive inter-network node CLI measurement reference signaling in accordance with the second configuration. For example, the network node may measure or monitor for one or more reference signals (e.g., an SSB and/or another form of RS) in one or more reception windows in accordance with the set of parameters indicated by the first configuration. Thus, an FD network node can perform inter-network node CLI measurement without causing self-interference at the FD network node, which improves efficiency of CLI measurement and inter-gNB communication.

As indicated above, FIG. 9 is provided as an example. Other examples may differ from what is described with regard to FIG. 9.

Figure 10:
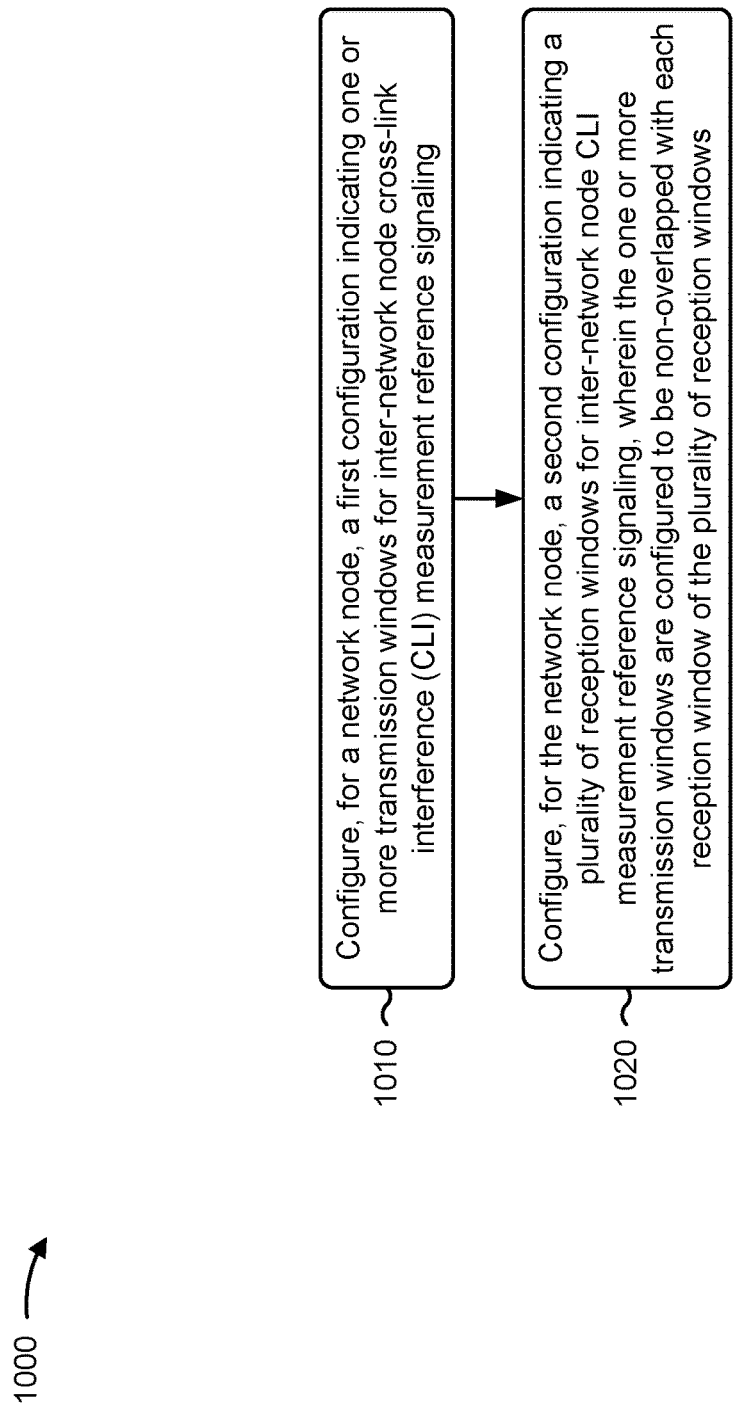
FIG. 10 is a diagram illustrating an example process performed, for example, by a central network entity, in accordance with the present disclosure.

FIG. 10 is a diagram illustrating an example process 1000 performed, for example, by a central network entity, in accordance with the present disclosure. Example process 1000 is an example where the central network entity (e.g., base station 110, network controller 130, base station 310, anchor base station 335, non-anchor base station 345, IAB donor 405, CU 510, DU 530, RU 540, network device 604, the central network entity 905) performs operations associated with non-overlapped CLI measurement reference signal transmission and reception windows.

As shown in FIG. 10, in some aspects, process 1000 may include configuring, for a network node, a first configuration indicating one or more transmission windows for inter-network node CLI measurement reference signaling (block 1010). For example, the central network entity (e.g., using communication manager 140 and/or configuration component 1208, depicted in FIG. 12) may configure, for a network node, a first configuration indicating one or more transmission windows for inter-network node CLI measurement reference signaling, as described above. In some aspects, the central network entity may transmit the first configuration. For example, the central network entity may provide the first configuration for transmission by a radio unit.

As further shown in FIG. 10, in some aspects, process 1000 may include configuring, for the network node, a second configuration indicating a plurality of reception windows for inter-network node CLI measurement reference signaling, wherein the one or more transmission windows are configured to be non-overlapped with each reception window of the plurality of reception windows (block 1020). For example, the central network entity (e.g., using communication manager 140 and/or configuration component 1208, depicted in FIG. 12) may configure, for the network node, a second configuration indicating a plurality of reception windows for inter-network node CLI measurement reference signaling, wherein the one or more transmission windows are configured to be non-overlapped with each reception window of the plurality of reception windows, as described above. In some aspects, the central network entity may transmit the second configuration. For example, the central network entity may provide the second configuration for transmission by a radio unit.

Process 1000 may include additional aspects, such as any single aspect or any combination of aspects described below and/or in connection with one or more other processes described elsewhere herein.

In a first aspect, each reception window, of the plurality of reception windows, is associated with a respective network node of a plurality of network nodes including the network node.

In a second aspect, alone or in combination with the first aspect, the network node is a first network node and wherein the method further comprises configuring, for a second network node, a particular reception window that overlaps, in time, the one or more transmission windows of the first network node.

In a third aspect, alone or in combination with one or more of the first and second aspects, the network node is a first network node and wherein the method further comprises configuring, for each network node of the plurality of network nodes other than the first network node, reception windows that overlap, in time, the one or more transmission windows of the first network node.

In a fourth aspect, alone or in combination with one or more of the first through third aspects, a particular reception window, of the plurality of reception windows, is associated with a corresponding network node based at least in part on the corresponding network node having a transmission window that overlaps the particular reception window.

In a fifth aspect, alone or in combination with one or more of the first through fourth aspects, the one or more transmission windows are periodic, and wherein the first configuration indicates to use one beam for transmission of the inter-network node CLI measurement reference signaling per occasion of the one or more transmission windows.

In a sixth aspect, alone or in combination with one or more of the first through fifth aspects, a first occasion of the one or more transmission windows is associated with a different beam than a beam associated with a second occasion of the one or more transmission windows.

In a seventh aspect, alone or in combination with one or more of the first through sixth aspects, the first configuration indicates to use beamsweeping for transmission of the inter-network node CLI measurement reference signaling in the one or more transmission windows.

In an eighth aspect, alone or in combination with one or more of the first through seventh aspects, the second configuration indicates to use beamsweeping for reception of the inter-network node CLI measurement reference signaling in a particular reception window of the plurality of reception windows.

In a ninth aspect, alone or in combination with one or more of the first through eighth aspects, a particular reception window of the plurality of reception windows is periodic, and wherein the second configuration indicates to use one beam for reception of the inter-network node CLI measurement reference signaling per occasion of the particular reception window.

In a tenth aspect, alone or in combination with one or more of the first through ninth aspects, a first occasion of the particular reception window is associated with a different beam than a beam associated with a second occasion of the particular reception window.

In an eleventh aspect, alone or in combination with one or more of the first through tenth aspects, process 1000 includes a duration of the transmission window, a periodicity of the transmission window, a time offset associated with the transmission window, a frequency location associated with the transmission window, a reference signal resource of the transmission window, a time and frequency location of the reference signal resource, a sequence identifier of the reference signal resource, a subcarrier spacing of the reference signal resource, transmitting beam information associated with the reference signal resource, a power parameter associated with the reference signal resource, or information associated with the reference signal resource.

In a twelfth aspect, alone or in combination with one or more of the first through eleventh aspects, the set of parameters is different for a first occasion of the transmission window than for a second occasion of the transmission window.

In a thirteenth aspect, alone or in combination with one or more of the first through twelfth aspects, the set of parameters is explicitly indicated by configuration signaling.

In a fourteenth aspect, alone or in combination with one or more of the first through thirteenth aspects, at least one parameter of the set of parameters is implicitly indicated by information associated with the network node.

In a fifteenth aspect, alone or in combination with one or more of the first through fourteenth aspects, process 1000 includes activating or deactivating inter-network node CLI measurement reference signaling in accordance with the first configuration.

In a sixteenth aspect, alone or in combination with one or more of the first through fifteenth aspects, the second configuration indicates, for a reception window of the plurality of reception windows, a set of parameters including at least one of a duration of the reception window, a periodicity of the reception window, a time offset associated with the reception window, a frequency location associated with the reception window, one or more reference signal sequence identifiers associated with inter-network node CLI measurement reference signaling in the reception window, or one or more parameters associated with a reference signal sequence identifier of the one or more reference signal sequence identifiers.

In a seventeenth aspect, alone or in combination with one or more of the first through sixteenth aspects, the one or more parameters include at least one of a transmitter identifier associated with the reference signal sequence identifier, a resource associated with the reference signal sequence identifier, receiving beam information associated with the reference signal sequence identifier, a transmit power associated with the reference signal sequence identifier, or information associated with the reference signal sequence identifier.

In an eighteenth aspect, alone or in combination with one or more of the first through seventeenth aspects, the set of parameters is different for a first occasion of the reception window than for a second occasion of the reception window.

In a nineteenth aspect, alone or in combination with one or more of the first through eighteenth aspects, the set of parameters is explicitly indicated by configuration signaling.

In a twentieth aspect, alone or in combination with one or more of the first through nineteenth aspects, at least one parameter of the set of parameters is implicitly indicated by information associated with the network node.

In a twenty-first aspect, alone or in combination with one or more of the first through twentieth aspects, process 1000 includes activating or deactivating reception of inter-network node CLI measurement reference signaling in accordance with the second configuration.

In a twenty-second aspect, alone or in combination with one or more of the first through twenty-first aspects, configuring the first configuration further comprises transmitting the first configuration, and configuring the second configuration further comprises transmitting the second configuration Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
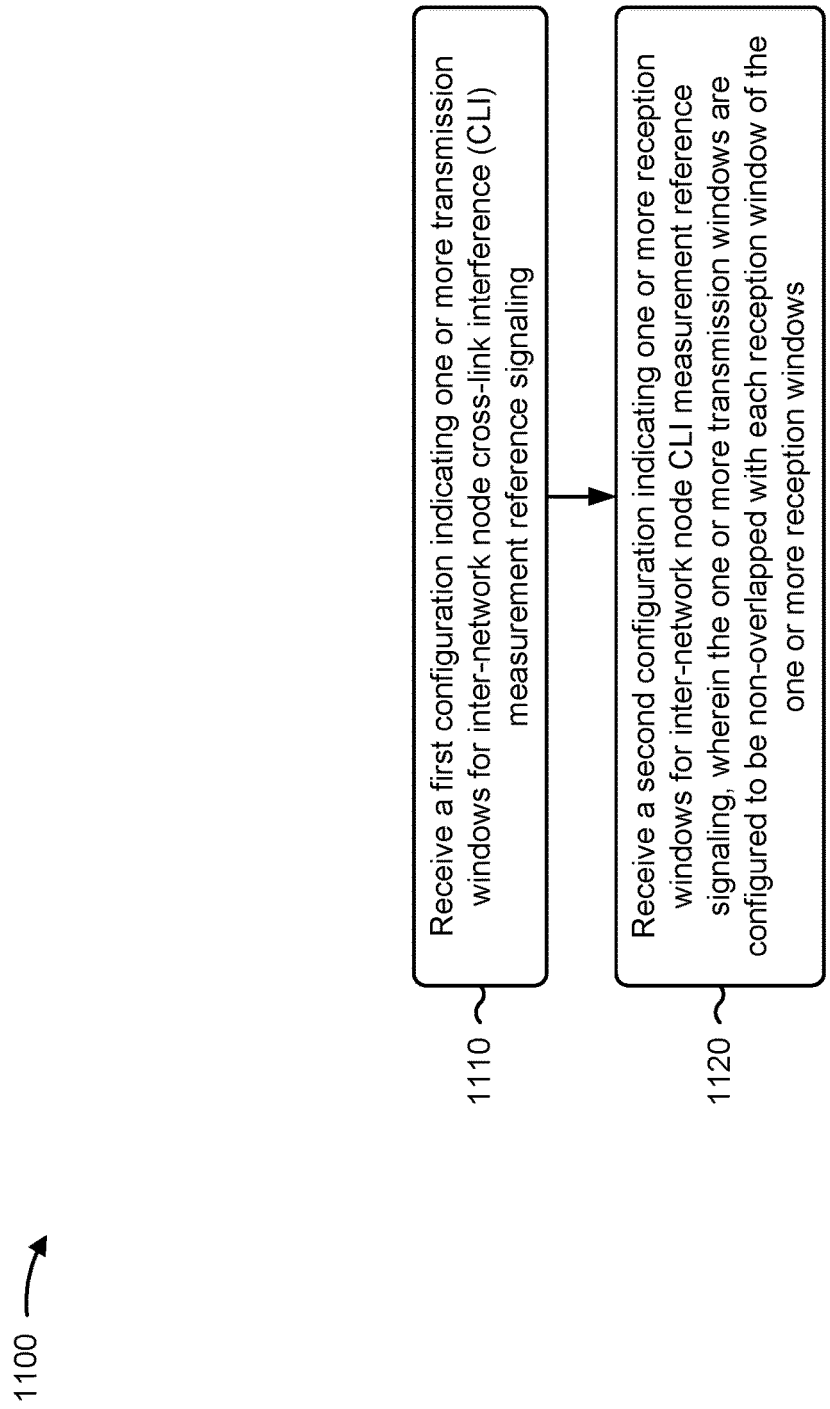
FIG. 11 is a diagram illustrating an example process performed, for example, by a network node, in accordance with the present disclosure.

FIG. 11 is a diagram illustrating an example process 1100 performed, for example, by a network node, in accordance with the present disclosure. Example process 1100 is an example where the network node (e.g., base station 110, base station 310, non-anchor base station 345, IAB node 410, an MT function of an IAB node 410 or a base station 110, a DU function of an IAB node 410 or a base station 110, DU 530, network device 604) performs operations associated with non-overlapped CLI measurement reference signal transmission and reception windows.

As shown in FIG. 11, in some aspects, process 1100 may include receiving a first configuration indicating one or more transmission windows for inter-network node CLI measurement reference signaling (block 1110). For example, the network node (e.g., using communication manager 150 and/or reception component 1302, depicted in FIG. 13) may receive a first configuration indicating one or more transmission windows for inter-network node CLI measurement reference signaling, as described above.

As further shown in FIG. 11, in some aspects, process 1100 may include receiving a second configuration indicating one or more reception windows for inter-network node CLI measurement reference signaling, wherein the one or more transmission windows are configured to be non-overlapped with each reception window of the one or more reception windows (block 1120). For example, the network node (e.g., using communication manager 150 and/or reception component 1302, depicted in FIG. 13) may receive a second configuration indicating one or more reception windows for inter-network node CLI measurement reference signaling, wherein the one or more transmission windows are configured to be non-overlapped with each reception window of the one or more reception windows, as described above.

Process 1100 may include additional aspects, such as any single aspect or any combination of aspects described below and/or in connection with one or more other processes described elsewhere herein.

In a first aspect, the one or more transmission windows are periodic, and wherein the first configuration indicates to use one beam for transmission of the inter-network node CLI measurement reference signaling per occasion of the one or more transmission windows.

In a second aspect, alone or in combination with the first aspect, a first occasion of the one or more transmission windows is associated with a different beam than a beam associated with a second occasion of the one or more transmission windows.

In a third aspect, alone or in combination with one or more of the first and second aspects, the first configuration indicates to use beamsweeping for transmission of the inter-network node CLI measurement reference signaling in the one or more transmission windows.

In a fourth aspect, alone or in combination with one or more of the first through third aspects, the second configuration indicates to use beamsweeping for reception of the inter-network node CLI measurement reference signaling in a particular reception window of the one or more reception windows.

In a fifth aspect, alone or in combination with one or more of the first through fourth aspects, a particular reception window of the one or more reception windows is periodic, and wherein the second configuration indicates to use one beam for reception of the inter-network node CLI measurement reference signaling per occasion of the particular reception window.

In a sixth aspect, alone or in combination with one or more of the first through fifth aspects, a first occasion of the particular reception window is associated with a different beam than a beam associated with a second occasion of the particular reception window.

In a seventh aspect, alone or in combination with one or more of the first through sixth aspects, process 1100 includes a duration of the transmission window, a periodicity of the transmission window, a time offset associated with the transmission window, a frequency location associated with the transmission window, a reference signal resource of the transmission window, a time and frequency location of the reference signal resource, a sequence identifier of the reference signal resource, a subcarrier spacing of the reference signal resource, transmitting beam information associated with the reference signal resource, a power parameter associated with the reference signal resource, or information associated with the reference signal resource.

In an eighth aspect, alone or in combination with one or more of the first through seventh aspects, the set of parameters is different for a first occasion of the transmission window than for a second occasion of the transmission window.

In a ninth aspect, alone or in combination with one or more of the first through eighth aspects, the set of parameters is explicitly indicated by configuration signaling.

In a tenth aspect, alone or in combination with one or more of the first through ninth aspects, at least one parameter of the set of parameters is implicitly indicated by information associated with the network node.

In an eleventh aspect, alone or in combination with one or more of the first through tenth aspects, process 1100 includes receiving a signal activating or deactivating inter-network node CLI measurement reference signaling in accordance with the first configuration, and transmitting inter-network node CLI measurement reference signaling based at least in part on the first configuration.

In a twelfth aspect, alone or in combination with one or more of the first through eleventh aspects, the second configuration indicates, for a reception window of the one or more reception windows, a set of parameters including at least one of a duration of the reception window, a periodicity of the reception window, a time offset associated with the reception window, a frequency location associated with the reception window, one or more reference signal sequence identifiers associated with inter-network node CLI measurement reference signaling in the reception window, or one or more parameters associated with a reference signal sequence identifier of the one or more reference signal sequence identifiers.

In a thirteenth aspect, alone or in combination with one or more of the first through twelfth aspects, the one or more parameters include at least one of a transmitter identifier associated with the reference signal sequence identifier, a resource associated with the reference signal sequence identifier, receiving beam information associated with the reference signal sequence identifier, a transmit power associated with the reference signal sequence identifier, or information associated with the reference signal sequence identifier.

In a fourteenth aspect, alone or in combination with one or more of the first through thirteenth aspects, the set of parameters is different for a first occasion of the reception window than for a second occasion of the reception window.

In a fifteenth aspect, alone or in combination with one or more of the first through fourteenth aspects, the set of parameters is explicitly indicated by configuration signaling.

In a sixteenth aspect, alone or in combination with one or more of the first through fifteenth aspects, at least one parameter of the set of parameters is implicitly indicated by information associated with the network node.

In a seventeenth aspect, alone or in combination with one or more of the first through sixteenth aspects, process 1100 includes receiving signaling activating or deactivating reception of inter-network node CLI measurement reference signaling in accordance with the second configuration, and receiving inter-network node CLI measurement reference signaling based at least in part on the second configuration.

In an eighteenth aspect, alone or in combination with one or more of the first through seventeenth aspects, process 1100 includes transmitting inter-network node CLI measurement reference signaling in accordance with the first configuration, or receiving inter-network node CLI measurement reference signaling in accordance with the second configuration.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
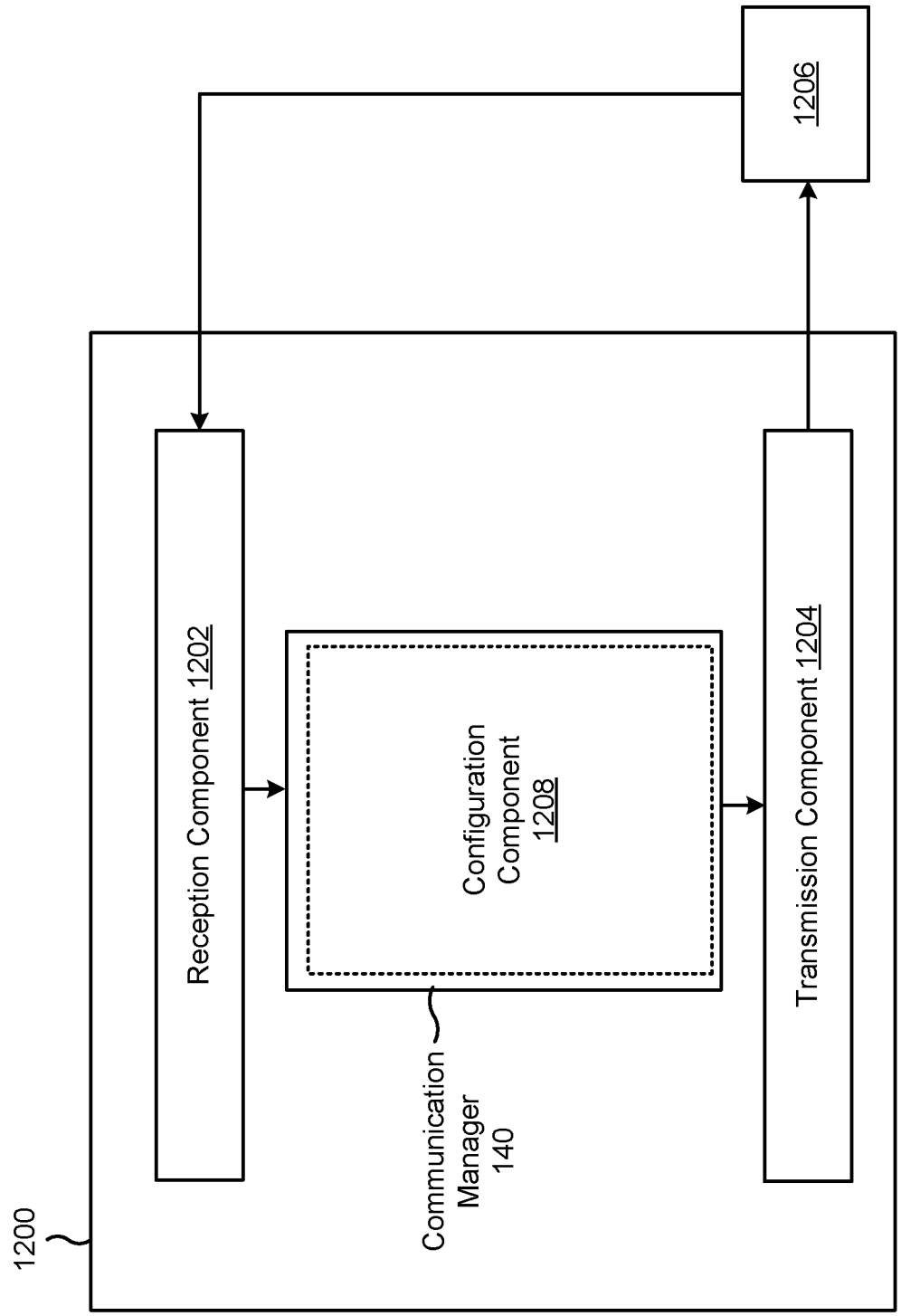
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a central network entity, or a central network entity may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a configuration component 1208, among other examples.

In some aspects, the apparatus 1200 may be configured to perform one or more operations described herein in connection with FIGS. 3-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the central network entity described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the central network entity described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the central network entity described in connection with FIG. 2. In some aspects, the transmission component 1204 may be co-located with the reception component 1202 in a transceiver.

The configuration component 1208 or the transmission component 1204 may configure, for a network node, a first configuration indicating one or more transmission windows for inter-network node CLI measurement reference signaling. The configuration component 1208 or the transmission component 1204 may configure, for the network node, a second configuration indicating a plurality of reception windows for inter-network node CLI measurement reference signaling, wherein the one or more transmission windows are configured to be non-overlapped with each reception window of the plurality of reception windows.

The configuration component 1208 may activate or deactivate inter-network node CLI measurement reference signaling in accordance with the first configuration.

The configuration component 1208 may activate or deactivate reception of inter-network node CLI measurement reference signaling in accordance with the second configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
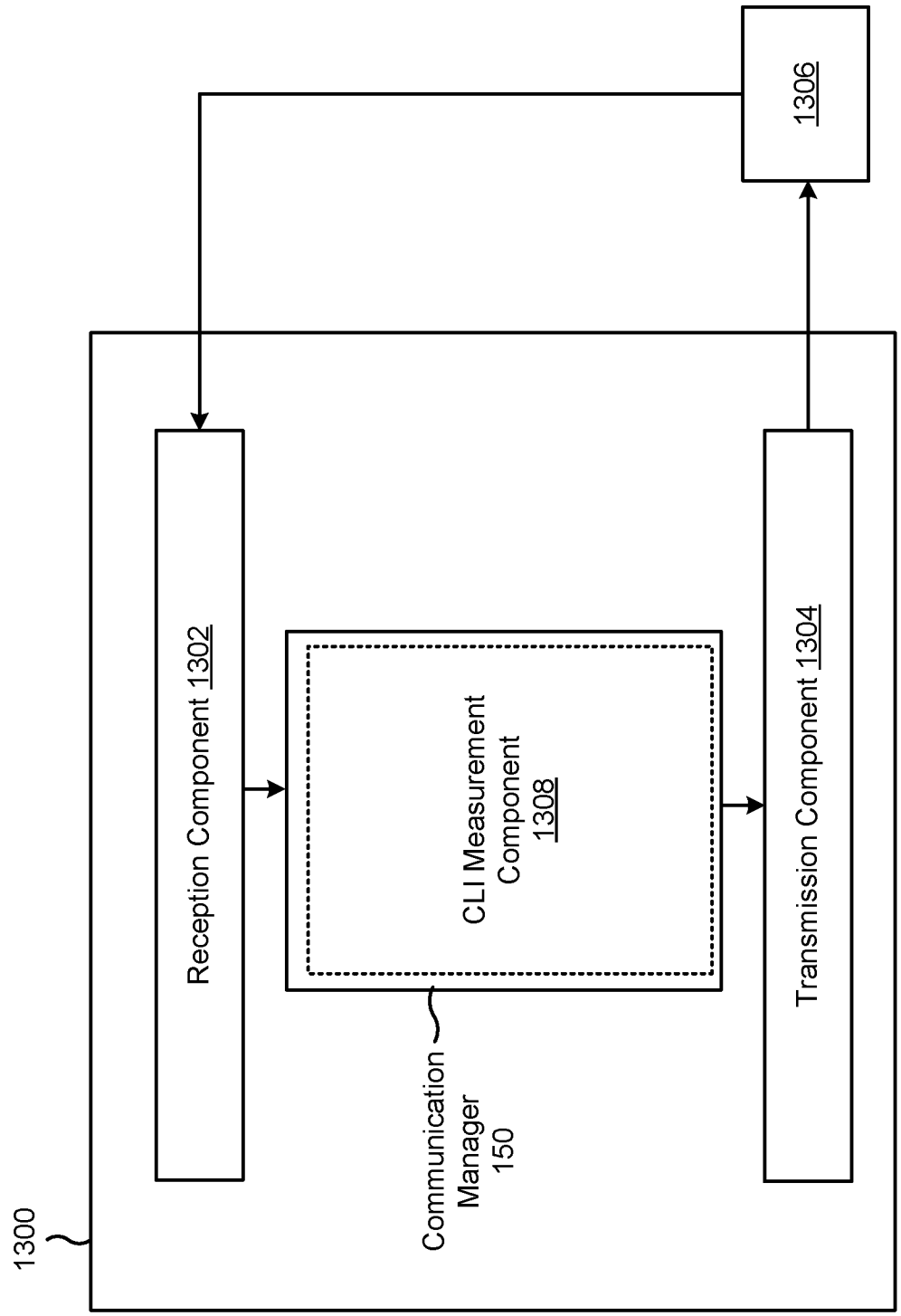
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a CLI measurement component 1308, among other examples.

In some aspects, the apparatus 1300 may be configured to perform one or more operations described herein in connection with FIGS. 3-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The reception component 1302 may receive a first configuration indicating one or more transmission windows for inter-network node CLI measurement reference signaling. The reception component 1302 may receive a second configuration indicating one or more reception windows for inter-network node CLI measurement reference signaling, wherein the one or more transmission windows are configured to be non-overlapped with each reception window of the one or more reception windows.

The reception component 1302 may receive a signal activating or deactivating inter-network node CLI measurement reference signaling in accordance with the first configuration transmitting inter-network node CLI measurement reference signaling based at least in part on the first configuration.

The reception component 1302 may receive signaling activating or deactivating reception of inter-network node CLI measurement reference signaling in accordance with the second configuration receiving inter-network node CLI measurement reference signaling based at least in part on the second configuration.

The transmission component 1304 may transmit inter-network node CLI measurement reference signaling in accordance with the first configuration.

The CLI measurement component 1308 may receive inter-network node CLI measurement reference signaling in accordance with the second configuration.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a central network entity, comprising: configuring, for a network node, a first configuration indicating one or more transmission windows for inter-network node cross-link interference (CLI) measurement reference signaling; and configuring, for the network node, a second configuration indicating a plurality of reception windows for inter-network node CLI measurement reference signaling, wherein the one or more transmission windows are configured to be non-overlapped with each reception window of the plurality of reception windows.

Aspect 2: The method of Aspect 1, wherein each reception window, of the plurality of reception windows, is associated with a respective network node of a plurality of network nodes including the network node.

Aspect 3: The method of Aspect 2, wherein the network node is a first network node and wherein the method further comprises: configuring, for a second network node, a particular reception window that overlaps, in time, the one or more transmission windows of the first network node.

Aspect 4: The method of Aspect 2, wherein the network node is a first network node and wherein the method further comprises: configuring, for each network node of the plurality of network nodes other than the first network node, reception windows that overlap, in time, the one or more transmission windows of the first network node.

Aspect 5: The method of Aspect 2, wherein a particular reception window, of the plurality of reception windows, is associated with a corresponding network node based at least in part on the corresponding network node having a transmission window that overlaps the particular reception window.

Aspect 6: The method of any of Aspects 1-5, wherein the one or more transmission windows are periodic, and wherein the first configuration indicates to use one beam for transmission of the inter-network node CLI measurement reference signaling per occasion of the one or more transmission windows.

Aspect 7: The method of Aspect 6, wherein a first occasion of the one or more transmission windows is associated with a different beam than a beam associated with a second occasion of the one or more transmission windows.

Aspect 8: The method of any of Aspects 1-7, wherein the first configuration indicates to use beamsweeping for transmission of the inter-network node CLI measurement reference signaling in the one or more transmission windows.

Aspect 9: The method of any of Aspects 1-8, wherein the second configuration indicates to use beamsweeping for reception of the inter-network node CLI measurement reference signaling in a particular reception window of the plurality of reception windows.

Aspect 10: The method of any of Aspects 1-9, wherein a particular reception window of the plurality of reception windows is periodic, and wherein the second configuration indicates to use one beam for reception of the inter-network node CLI measurement reference signaling per occasion of the particular reception window.

Aspect 11: The method of Aspect 10, wherein a first occasion of the particular reception window is associated with a different beam than a beam associated with a second occasion of the particular reception window.

Aspect 12: The method of any of Aspects 1-10, wherein, for a transmission window of the one or more transmission windows, the first configuration indicates a set of parameters including at least one of: a duration of the transmission window, a periodicity of the transmission window, a time offset associated with the transmission window, a frequency location associated with the transmission window, a reference signal resource of the transmission window, a time and frequency location of the reference signal resource, a sequence identifier of the reference signal resource, a subcarrier spacing of the reference signal resource, transmit beam information associated with the reference signal resource, a power parameter associated with the reference signal resource, or repetition information associated with the reference signal resource.

Aspect 13: The method of Aspect 12, wherein the set of parameters is different for a first occasion of the transmission window than for a second occasion of the transmission window.

Aspect 14: The method of Aspect 12, wherein the set of parameters is explicitly indicated by configuration signaling.

Aspect 15: The method of Aspect 12, wherein at least one parameter of the set of parameters is implicitly indicated by information associated with the network node.

Aspect 16: The method of any of Aspects 1-15, further comprising activating or deactivating inter-network node CLI measurement reference signaling in accordance with the first configuration.

Aspect 17: The method of any of Aspects 1-16, wherein the second configuration indicates, for a reception window of the plurality of reception windows, a set of parameters including at least one of: a duration of the reception window, a periodicity of the reception window, a time offset associated with the reception window, a frequency location associated with the reception window, one or more reference signal sequence identifiers associated with inter-network node CLI measurement reference signaling in the reception window, or one or more parameters associated with a reference signal sequence identifier of the one or more reference signal sequence identifiers.

Aspect 18: The method of Aspect 17, wherein the one or more parameters include at least one of: a transmitter identifier associated with the reference signal sequence identifier, a resource associated with the reference signal sequence identifier, receive beam information associated with the reference signal sequence identifier, a transmit power associated with the reference signal sequence identifier, or repetition information associated with the reference signal sequence identifier.

Aspect 19: The method of Aspect 17, wherein the set of parameters is different for a first occasion of the reception window than for a second occasion of the reception window.

Aspect 20: The method of Aspect 17, wherein the set of parameters is explicitly indicated by configuration signaling.

Aspect 21: The method of Aspect 17, wherein at least one parameter of the set of parameters is implicitly indicated by information associated with the network node.

Aspect 22: The method of any of Aspects 1-21, further comprising activating or deactivating reception of inter-network node CLI measurement reference signaling in accordance with the second configuration.

Aspect 23: A method of wireless communication performed by a network node, comprising: receiving a first configuration indicating one or more transmission windows for inter-network node cross-link interference (CLI) measurement reference signaling; and receiving a second configuration indicating one or more reception windows for inter-network node CLI measurement reference signaling, wherein the one or more transmission windows are configured to be non-overlapped with each reception window of the one or more reception windows.

Aspect 24: The method of Aspect 23, wherein the one or more transmission windows are periodic, and wherein the first configuration indicates to use one beam for transmission of the inter-network node CLI measurement reference signaling per occasion of the one or more transmission windows.

Aspect 25: The method of Aspect 24, wherein a first occasion of the one or more transmission windows is associated with a different beam than a beam associated with a second occasion of the one or more transmission windows.

Aspect 26: The method of Aspect 24, wherein the first configuration indicates to use beamsweeping for transmission of the inter-network node CLI measurement reference signaling in the one or more transmission windows.

Aspect 27: The method of any of Aspects 23-26, wherein the second configuration indicates to use beamsweeping for reception of the inter-network node CLI measurement reference signaling in a particular reception window of the one or more reception windows.

Aspect 28: The method of any of Aspects 23-27, wherein a particular reception window of the one or more reception windows is periodic, and wherein the second configuration indicates to use one beam for reception of the inter-network node CLI measurement reference signaling per occasion of the particular reception window.

Aspect 29: The method of Aspect 28, wherein a first occasion of the particular reception window is associated with a different beam than a beam associated with a second occasion of the particular reception window.

Aspect 30: The method of any of Aspects 23-29, wherein, for a transmission window of the one or more transmission windows, the first configuration indicates a set of parameters including at least one of: a duration of the transmission window, a periodicity of the transmission window, a time offset associated with the transmission window, a frequency location associated with the transmission window, a reference signal resource of the transmission window, a time and frequency location of the reference signal resource, a sequence identifier of the reference signal resource, a subcarrier spacing of the reference signal resource, transmit beam information associated with the reference signal resource, a power parameter associated with the reference signal resource, or repetition information associated with the reference signal resource.

Aspect 31: The method of Aspect 30, wherein the set of parameters is different for a first occasion of the transmission window than for a second occasion of the transmission window.

Aspect 32: The method of Aspect 30, wherein the set of parameters is explicitly indicated by configuration signaling.

Aspect 33: The method of Aspect 30, wherein at least one parameter of the set of parameters is implicitly indicated by information associated with the network node.

Aspect 34: The method of any of Aspects 23-33, further comprising receiving a signal activateing or deactivating inter-network node CLI measurement reference signaling in accordance with the first configuration; and transmitting inter-network node CLI measurement reference signaling based at least in part on the first configuration.

Aspect 35: The method of any of Aspects 23-34, wherein the second configuration indicates, for a reception window of the one or more reception windows, a set of parameters including at least one of: a duration of the reception window, a periodicity of the reception window, a time offset associated with the reception window, a frequency location associated with the reception window, one or more reference signal sequence identifiers associated with inter-network node CLI measurement reference signaling in the reception window, or one or more parameters associated with a reference signal sequence identifier of the one or more reference signal sequence identifiers.

Aspect 36: The method of Aspect 35, wherein the one or more parameters include at least one of: a transmitter identifier associated with the reference signal sequence identifier, a resource associated with the reference signal sequence identifier, receive beam information associated with the reference signal sequence identifier, a transmit power associated with the reference signal sequence identifier, or repetition information associated with the reference signal sequence identifier.

Aspect 37: The method of Aspect 35, wherein the set of parameters is different for a first occasion of the reception window than for a second occasion of the reception window.

Aspect 38: The method of Aspect 35, wherein the set of parameters is explicitly indicated by configuration signaling.

Aspect 39: The method of Aspect 35, wherein at least one parameter of the set of parameters is implicitly indicated by information associated with the network node.

Aspect 40: The method of any of Aspects 23-39, further comprising receiving signaling activating or deactivating reception of inter-network node CLI measurement reference signaling in accordance with the second configuration; and receiving inter-network node CLI measurement reference signaling based at least in part on the second configuration.

Aspect 41: The method of any of Aspects 23-40, further comprising: transmitting inter-network node CLI measurement reference signaling in accordance with the first configuration; or receiving inter-network node CLI measurement reference signaling in accordance with the second configuration.

Aspect 42: An apparatus for wireless communication at a device, comprising a processor; memory coupled with the processor; and instructions stored in the memory and executable by the processor to cause the apparatus to perform the method of one or more of Aspects 1-41.

Aspect 43: A device for wireless communication, comprising a memory and one or more processors coupled to the memory, the one or more processors configured to perform the method of one or more of Aspects 1-41.

Aspect 44: An apparatus for wireless communication, comprising at least one means for performing the method of one or more of Aspects 1-41.

Aspect 45: A non-transitory computer-readable medium storing code for wireless communication, the code comprising instructions executable by a processor to perform the method of one or more of Aspects 1-41.

Aspect 46: A non-transitory computer-readable medium storing a set of instructions for wireless communication, the set of instructions comprising one or more instructions that, when executed by one or more processors of a device, cause the device to perform the method of one or more of Aspects 1-41.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a central network entity, comprising:
   one or more memories; and
   one or more processors, coupled to the one or more memories, configured to cause the central network entity to:
      configure, for a first network node of a plurality of network nodes, a first configuration indicating one or more transmission windows, for the first network node, for inter-network node cross-link interference (CLI) measurement reference signaling;
      configure, for the first network node, a second configuration indicating a plurality of reception windows, for the first network node, for inter-network node CLI measurement reference signaling, wherein the one or more transmission windows are configured to be non-overlapped with each reception window of the plurality of reception windows; and
      configure, for each network node of the plurality of network nodes other than the first network node, respective reception windows that overlap, in time, with the one or more transmission windows of the first network node, wherein the respective reception windows are configured to be non-overlapped.

2. The apparatus of claim 1, wherein, to configure the first configuration, the one or more processors are configured to cause the central network entity to transmit the first configuration, and wherein, to configure the second configuration, the one or more processors are configured to cause the central network entity to transmit the second configuration.

3. The apparatus of claim 1, wherein each reception window, of the plurality of reception windows, is associated with a respective network node of a plurality of network nodes.

4. The apparatus of claim 3, wherein the one or more processors are configured to cause the central network entity to:
   configure, for a second network node, a particular reception window that overlaps, in time, with the one or more transmission windows of the first network node.

5. The apparatus of claim 3, wherein a particular reception window, of the plurality of reception windows, is associated with a corresponding network node based at least in part on the corresponding network node having a transmission window that overlaps the particular reception window.

6. The apparatus of claim 1, wherein the one or more transmission windows are periodic, and wherein the first configuration indicates to use one beam for transmission of the inter-network node CLI measurement reference signaling per occasion of the one or more transmission windows.

7. The apparatus of claim 1, wherein the first configuration indicates to use beamsweeping for transmission of the inter-network node CLI measurement reference signaling in the one or more transmission windows.

8. The apparatus of claim 1, wherein the second configuration indicates to use beamsweeping for reception of the inter-network node CLI measurement reference signaling in a particular reception window of the plurality of reception windows.

9. The apparatus of claim 1, wherein a particular reception window of the plurality of reception windows is periodic, and wherein the second configuration indicates to use one beam for reception of the inter-network node CLI measurement reference signaling per occasion of the particular reception window.

10. The apparatus of claim 1, wherein, for a transmission window of the one or more transmission windows, the first configuration indicates a set of parameters including at least one of:
   a duration of the transmission window,
   a periodicity of the transmission window,
   a time offset associated with the transmission window,
   a frequency location associated with the transmission window,
   a reference signal resource of the transmission window,
   a time and frequency location of the reference signal resource,
   a sequence identifier of the reference signal resource,
   a subcarrier spacing of the reference signal resource,
   transmit beam information associated with the reference signal resource,
   a power parameter associated with the reference signal resource, or repetition information associated with the reference signal resource.

11. The apparatus of claim 1, wherein the one or more processors are further configured to cause the central network entity to transmit signaling to activate or deactivate inter-network node CLI measurement reference signaling in accordance with the first configuration.

12. The apparatus of claim 1, wherein the second configuration indicates, for a reception window of the plurality of reception windows, a set of parameters including at least one of:
a duration of the reception window,
a periodicity of the reception window,
a time offset associated with the reception window,
a frequency location associated with the reception window,
one or more reference signal sequence identifiers associated with inter-network node CLI measurement reference signaling in the reception window, or
one or more parameters associated with a reference signal sequence identifier of the one or more reference signal sequence identifiers.

13. The apparatus of claim 12, wherein the one or more parameters include at least one of:
a transmitter identifier associated with the reference signal sequence identifier,
a resource associated with the reference signal sequence identifier,
receive beam information associated with the reference signal sequence identifier,
a transmit power associated with the reference signal sequence identifier, or
repetition information associated with the reference signal sequence identifier.

14. The apparatus of claim 1, wherein the one or more processors are further configured to cause the central network entity to transmit signaling to activate or deactivate reception of inter-network node CLI measurement reference signaling in accordance with the second configuration.

15. An apparatus for wireless communication at a first network node, comprising:
one or more memories; and
one or more processors, coupled to the one or more memories, configured to cause the first network node to:
receive a first configuration indicating one or more transmission windows, for the first network node of a plurality of network nodes, for inter-network node cross-link interference (CLI) measurement reference signaling, wherein the one or more transmission windows each overlap, in time, with respective reception windows for each network node of the plurality of network nodes other than the first network node, wherein the respective reception windows are configured to be non-overlapped; and
receive a second configuration indicating one or more reception windows, for the first network node, for inter-network node CLI measurement reference signaling, wherein the one or more transmission windows are configured to be non-overlapped with each reception window of the one or more reception windows.

16. The apparatus of claim 15, wherein the one or more transmission windows are periodic, and wherein the first configuration indicates to use one beam for transmission of the inter-network node CLI measurement reference signaling per occasion of the one or more transmission windows.

17. The apparatus of claim 15, wherein the second configuration indicates to use beamsweeping for reception of the inter-network node CLI measurement reference signaling in a particular reception window of the one or more reception windows.

18. The apparatus of claim 15, wherein a particular reception window of the one or more reception windows is periodic, and wherein the second configuration indicates to use one beam for reception of the inter-network node CLI measurement reference signaling per occasion of the particular reception window.

19. The apparatus of claim 15, wherein the one or more processors are further configured to cause the first network node to receive a signal activating or deactivating inter-network node CLI measurement reference signaling in accordance with the first configuration; and
transmit inter-network node CLI measurement reference signaling based at least in part on the first configuration.

20. The apparatus of claim 15, wherein the one or more processors are further configured to cause the first network node to:
transmit inter-network node CLI measurement reference signaling in accordance with the first configuration; or
receive inter-network node CLI measurement reference signaling in accordance with the second configuration.

21. A method of wireless communication performed by a central network entity, comprising:
configuring, for a first network node of a plurality of network nodes, a first configuration indicating one or more transmission windows, for the first network node, for inter-network node cross-link interference (CLI) measurement reference signaling;
configuring, for the first network node, a second configuration indicating a plurality of reception windows, for the first network node, for inter-network node CLI measurement reference signaling, wherein the one or more transmission windows are configured to be non-overlapped with each reception window of the plurality of reception windows; and
configuring, for each network node of the plurality of network nodes other than the first network node, respective reception windows that overlap, in time, with the one or more transmission windows of the first network node, wherein the respective reception windows are configured to be non-overlapped.

22. The method of claim 21, wherein each reception window, of the plurality of reception windows, is associated with a respective network node of a plurality of network nodes.

23. The method of claim 22, wherein the first network node is a first network node and wherein the method further comprises:
configuring, for a second network node, a particular reception window that overlaps, in time, with the one or more transmission windows of the first network node.

24. The method of claim 22, wherein a particular reception window, of the plurality of reception windows, is associated with a corresponding network node based at least in part on the corresponding network node having a transmission window that overlaps the particular reception window.

25. The method of claim 21, wherein the one or more transmission windows are periodic, and wherein the first configuration indicates to use one beam for transmission of the inter-network node CLI measurement reference signaling per occasion of the one or more transmission windows.

26. The method of claim 21, wherein the first configuration indicates to use beamsweeping for transmission of the inter-network node CLI measurement reference signaling in the one or more transmission windows.

27. A method of wireless communication performed by a first network node, comprising:
- receiving a first configuration indicating one or more transmission windows, for the first network node of a plurality of network nodes, for inter-network node cross-link interference (CLI) measurement reference signaling, wherein the one or more transmission windows each overlap, in time, with respective reception windows for each network node of the plurality of network nodes other than the first network node, wherein the respective reception windows are configured to be non-overlapped; and
- receiving a second configuration indicating one or more reception windows, for the first network node, for inter-network node CLI measurement reference signaling, wherein the one or more transmission windows are configured to be non-overlapped with each reception window of the one or more reception windows.

28. The method of claim 27, wherein the one or more transmission windows are periodic, and wherein the first configuration indicates to use one beam for transmission of the inter-network node CLI measurement reference signaling per occasion of the one or more transmission windows.

29. The method of claim 28, wherein a first occasion of the one or more transmission windows is associated with a different beam than a beam associated with a second occasion of the one or more transmission windows.

30. The method of claim 28, wherein the first configuration indicates to use beamsweeping for transmission of the inter-network node CLI measurement reference signaling in the one or more transmission windows.

* * * * *